(12) United States Patent
Agrawal et al.

(10) Patent No.: US 12,379,841 B2
(45) Date of Patent: Aug. 5, 2025

(54) SYSTEMS AND METHODS FOR PERFORMING DATA COMPRESSION IN MEMORY

(71) Applicant: Samsung Electronics Co., Ltd., Suwon-si (KR)

(72) Inventors: Vipin Kumar Agrawal, San Jose, CA (US); Young Deok Kim, San Jose (CA)

(73) Assignee: SAMSUNG ELECTRONICS CO., LTD. (KR)

(*) Notice: Subject to any disclaimer, the term of this patent is extended or adjusted under 35 U.S.C. 154(b) by 0 days.

(21) Appl. No.: 17/989,672

(22) Filed: Nov. 17, 2022

(65) Prior Publication Data
US 2024/0094908 A1   Mar. 21, 2024

Related U.S. Application Data

(60) Provisional application No. 63/408,459, filed on Sep. 20, 2022.

(51) Int. Cl.
*G06F 3/06* (2006.01)

(52) U.S. Cl.
CPC .......... *G06F 3/0608* (2013.01); *G06F 3/0635* (2013.01); *G06F 3/0656* (2013.01); *G06F 3/0673* (2013.01)

(58) Field of Classification Search
CPC .... G06F 3/0608; G06F 3/0635; G06F 3/0656; G06F 3/0673
USPC .................................................. 711/154, 100
See application file for complete search history.

(56) References Cited

U.S. PATENT DOCUMENTS

| | | | |
|---|---|---|---|
| 6,523,102 | B1 | 2/2003 | Dye et al. |
| 7,702,875 | B1* | 4/2010 | Ekman ............... G06F 12/08 711/170 |
| 9,405,621 | B2 | 8/2016 | Yu et al. |
| 9,740,621 | B2 | 8/2017 | Heddes et al. |
| 10,176,090 | B2 | 1/2019 | Verrilli et al. |
| 10,496,312 | B2 | 12/2019 | Lee |
| 10,613,756 | B2 | 4/2020 | Shin et al. |
| 11,113,783 | B2 | 9/2021 | Appu et al. |
| 11,361,496 | B2 | 6/2022 | Maiyuran et al. |
| 2003/0009538 | A1* | 1/2003 | Shah ............... H04L 67/568 709/219 |
| 2003/0061457 | A1* | 3/2003 | Geiger ............... G06F 12/08 711/165 |

(Continued)

OTHER PUBLICATIONS

European Extended Search Report for Application No. 23191628.9, mailed Jan. 26, 2024.

*Primary Examiner* — Hosain T Alam
*Assistant Examiner* — Zubair Ahmed
(74) *Attorney, Agent, or Firm* — Renaissance IP Law Group LLP

(57) ABSTRACT

An appliance is described. A write engine may process a write request from an application to write a first data into a memory. The write request may including the first data and an address. A compression engine may compress the first data to produce a first compressed data. A write module may store the first compressed data in the memory. The first data may be a first part of a page that may further include a second data as a second part. The first compressed data may be a first part of a compressed page that may further include a second compressed data as a second part.

20 Claims, 18 Drawing Sheets

(56) References Cited

U.S. PATENT DOCUMENTS

| | | |
|---|---|---|
| 2012/0072641 A1 | 3/2012 | Suzuki et al. |
| 2013/0205071 A1* | 8/2013 | Vasudevan ............ G06F 3/0608 |
| | | 711/E12.008 |
| 2015/0242309 A1 | 8/2015 | Talagala et al. |
| 2016/0224241 A1 | 8/2016 | Verrilli et al. |
| 2017/0206172 A1 | 7/2017 | Ma et al. |
| 2018/0026655 A1 | 1/2018 | Gopal et al. |
| 2019/0004942 A1* | 1/2019 | Fujii .................... G06F 3/0689 |
| 2021/0117360 A1 | 4/2021 | Kutch et al. |
| 2022/0342578 A1* | 10/2022 | Chen .................... G06F 3/0653 |
| 2022/0357980 A1* | 11/2022 | Jang .................... G06F 3/0659 |
| 2023/0400980 A1* | 12/2023 | Wang .................... G06T 9/005 |

* cited by examiner

|          | 515 | 520 | 525 |
|          | ↓ | ↓ | ↓ |

505

| Host Address | Access Pattern | Comp. Type |
|---|---|---|
| 0xC000 0000 | 1 | 4 |
| 0xA000 0000 | 2 | 1 |
| 0x8000 0000 | 0 | 0 |

510-1 → row 1
510-2 → row 2
510-3 → row 3

|  | 515 | 610 |
|  | ↓ | ↓ |

440

| Host Address | Device Address |
|---|---|
| 0xC000 0000 | 0xA000 0000 |
| 0xD000 0000 | 0xD000 0000 |
| 0x8000 0000 | 0x4000 0000 |

SYSTEMS AND METHODS FOR PERFORMING DATA COMPRESSION IN MEMORY

RELATED APPLICATION DATA

This application claims the benefit of U.S. Provisional Patent Application Ser. No. 63/408,459, filed Sep. 20, 2022, which is incorporated by reference herein for all purposes.

FIELD

The disclosure relates generally to memory, and more particularly to pooled memory in a system.

BACKGROUND

Memory requirements for computer systems continue to grow. As more memory is needed, the overall amount spent on memory for computer systems continues to grow, even as memory itself becomes less expensive per unit.

A need remains for to offer increased memory in computer systems.

BRIEF DESCRIPTION OF THE DRAWINGS

The drawings described below are examples of how embodiments of the disclosure may be implemented, and are not intended to limit embodiments of the disclosure. Individual embodiments of the disclosure may include elements not shown in particular figures and/or may omit elements shown in particular figures. The drawings are intended to provide illustration and may not be to scale.

FIG. 5 shows details of information that may be stored in the metadata store of FIG. 4, according to embodiments of the disclosure.

FIG. 6 shows details of the address map of FIG. 4, according to embodiments of the disclosure.

SUMMARY

Figure 1:
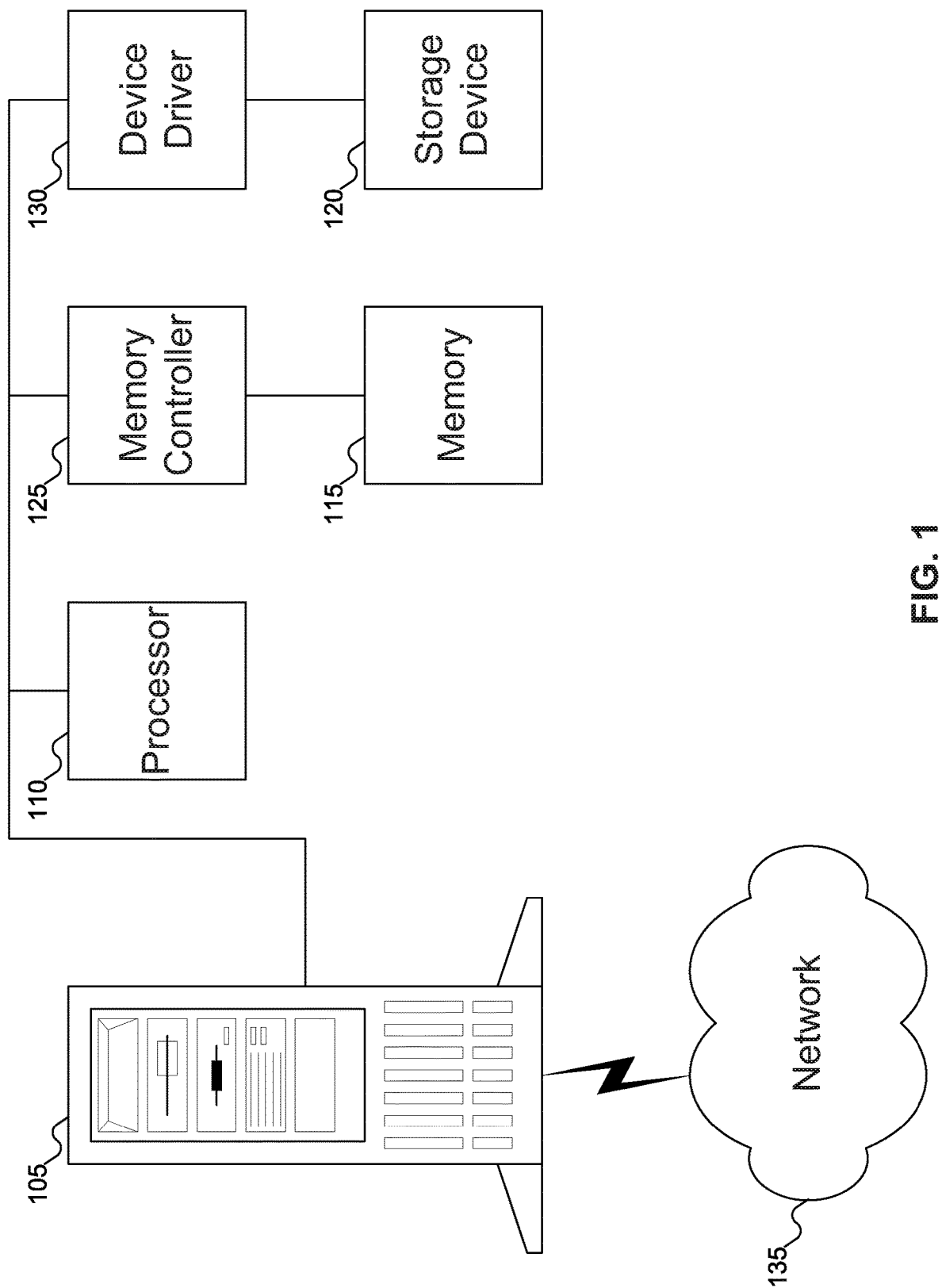
FIG. 1 shows a system including a storage device that may be used as pooled memory, according to embodiments of the disclosure.

Embodiments of the disclosure include an appliance that may be used as pooled memory. The appliance may include volatile storage and non-volatile storage. Data stored in the volatile storage may be compressed, so that storage device may offer to store more data than the volatile storage has capacity. The non-volatile storage may be used as a backup storage in case the data in the volatile storage may not be compressed sufficiently.

DETAILED DESCRIPTION

Reference will now be made in detail to embodiments of the disclosure, examples of which are illustrated in the accompanying drawings. In the following detailed description, numerous specific details are set forth to enable a thorough understanding of the disclosure. It should be understood, however, that persons having ordinary skill in the art may practice the disclosure without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first module could be termed a second module, and, similarly, a second module could be termed a first module, without departing from the scope of the disclosure.

The terminology used in the description of the disclosure herein is for the purpose of describing particular embodiments only and is not intended to be limiting of the disclosure. As used in the description of the disclosure and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

Applications continue to grow in size, and to use more memory. Even as the cost per unit of memory continues to drop, the increase in demand for memory may drive the overall cost of the system upwards.

Rather than just using the memory directly attached to a node, applications may access pooled memory that may be spread across multiple locations. For example, the system might include a switch with multiple memory devices attached to the switch: these memory devices may each include some memory, which may be collectively pooled. Applications may then use portions of memory spread across the entire pool, rather than being dedicated to a single memory appliance.

Embodiments of the disclosure offer an approach for compressing pooled memory. By compressing the pooled memory, the amount of data that may be stored in the pooled memory may be larger than stated capacity of the individual memory appliances, which may be cache coherent interconnect storage devices. Alternatively, the same amount of memory may be offered using a smaller amount of memory.

Embodiments of the disclosure may use compression that has low overhead, so that the overhead of using compression does not negate the benefits of compressing data in the memory. The compression may have low latency, so that the use of compression/decompression has a minimal impact on data access times, particularly data retrieval.

But the overall capacity of compressed pooled memory may be non-deterministic (the overall capacity may vary with the data stored in the pooled memory). To ensure that the memory appliances may store the advertised amount of data (which may be greater than the stated capacity of the memory modules used in the memory appliances), the memory appliances may also include additional non-volatile storage. This non-volatile storage may be used as a backup storage in case the volatile storage, even when storing compressed data, is used to capacity. By including non-volatile storage, the memory appliances may continue to operate as advertised, although some operations might experience degraded performance. The non-volatile storage may be a low latency non-volatile storage, so that the impact to performance may be minimized.

FIG. 1 shows a system including a storage device that may be used as pooled memory, according to embodiments of the disclosure. In FIG. 1, machine 105, which may also be termed a host or a system, may include processor 110, memory 115, and storage device 120. Processor 110 may be any variety of processor. (Processor 110, along with the other components discussed below, are shown outside the machine for ease of illustration: embodiments of the disclosure may include these components within the machine.) While FIG. 1 shows a single processor 110, machine 105 may include any number of processors, each of which may be single core or multi-core processors, each of which may implement a Reduced Instruction Set Computer (RISC) architecture or a Complex Instruction Set Computer (CISC) architecture (among other possibilities), and may be mixed in any desired combination.

Processor 110 may be coupled to memory 115. Memory 115 may be any variety of memory, such as flash memory, Dynamic Random Access Memory (DRAM), Static Random Access Memory (SRAM), Persistent Random Access Memory, Ferroelectric Random Access Memory (FRAM), or Non-Volatile Random Access Memory (NVRAM), such as Magnetoresistive Random Access Memory (MRAM) etc. Memory 115 may be a volatile or non-volatile memory, as desired. Memory 115 may also be any desired combination of different memory types, and may be managed by memory controller 125. Memory 115 may be used to store data that may be termed "short-term": that is, data not expected to be stored for extended periods of time. Examples of short-term data may include temporary files, data being used locally by applications (which may have been copied from other storage locations), and the like.

Processor 110 and memory 115 may also support an operating system under which various applications may be running. These applications may issue requests (which may also be termed commands) to read data from or write data to either memory 115. When storage device 120 is used to support applications reading or writing data via some sort of file system, storage device 120 may be accessed using device driver 130. While FIG. 1 shows one storage device 120, there may be any number of storage devices in machine 105. Different storage devices 120 may support different protocols and/or interfaces.

Storage device 120 may support any desired protocol or protocols, including, for example, the Non-Volatile Memory Express (NVMe) protocol or a cache-coherent interconnect protocol, such as the Compute Express Link (CXL) protocol. A cache coherent interconnect protocol may support both block-level protocol (or any other higher level of granularity) access and byte-level protocol (or any other lower level of granularity) access to data on storage device 120. For example, the CXL protocol may support accessing data in blocks using the CXL.io protocol and accessing data in bytes using the CXL.mem protocol. In this manner, data on a CXL storage device may be accessed as either block-level data (like a Solid State Drive (SSD)) or byte-level data (such as a memory): the CXL storage device may be used to extend the system memory. A cache coherent interconnect protocol may support both block-level protocol (or any other higher level of granularity) access and byte-level protocol (or any other lower level of granularity) access to data on storage device 120. For example, the CXL protocol may support accessing data in blocks using the CXL.io protocol and accessing data in bytes using the CXL.mem protocol. In this manner, data on a CXL storage device may be accessed as either block-level data (like a Solid State Drive (SSD)) or byte-level data (such as a memory): the CXL storage device may be used to extend the system memory. In some embodiments of the disclosure, the CXL storage device may function solely to extend the system memory; in other embodiments of the disclosure, the CXL storage device may be used both to extend system memory and to function as a storage device (that is, to process file system requests to access data on the storage device).

While FIG. 1 uses the generic term "storage device", embodiments of the disclosure may include any storage device formats, examples of which may include hard disk drives and SSDs. Any reference to "SSD" below should be understood to include such other embodiments of the disclosure. Further, different types of storage devices may be mixed. For example, one storage device 120 might be a hard disk drive, and another storage device 120 might be an SSD.

Machine 105 may be connected to a network, such as network 135. Network 135 may be any variety of network. Network 135 may be a wired network or a wireless network. Network 135 may be a Local Area Network (LAN), a Wide Area Network (WAN), a Metropolitan Area Network (MAN), or a world-wide network, such as the Internet, among other possibilities. Network 135 may also include portions that may be different types of networks. For example, network 135 might include a wired portion and a wireless portion, or network 135 might include various LANs connected by the Internet.

To interface with network 135, machine 105 may have a component (not shown in FIG. 1) to interface with network 135. This component may be, for example, a network interface card.

In some embodiments of the disclosure, machine 105 may act as a device to offer memory that may be used by applications running on machines (either machine 105 or other machines) connected to network 135: this memory may be pooled with memory on other devices connected to network 135. When memory is pooled, the memory may be divided into portions, each of which may be used by a different application running on a machine on network 135. In some embodiments of the disclosure, applications may also use memory on more than one machine 105 across network 135. Thus, machine 105 may offer memory that may be used by multiple applications, each of which may also be using memory offered by other machines on network 135.

In some embodiments of the disclosure, machine 105 may have a primary or major use of offering memory that may be pooled memory for use by applications. In such embodiments of the disclosure, machine 105 might omit one or more components shown in FIG. 1. For example, machine 105 might not include processor 110 (or might include a more specific purpose component, such as a controller, which might also replace device driver 130). In addition, in some embodiments of the disclosure, memory 115 may be part of storage device 120, in which case memory 115 and memory controller 125 might be omitted. In other embodiments of the disclosure, the entire functionality of machine 105 may be built into storage device 120. Storage device 120 might even have an interface to network 135 built in, avoiding the need for an extra component to interface with network 135 (for example, an Ethernet SSD). The term "appliance" is also used herein to describe machine 105 and all variations thereof described herein, regardless of its specific configuration.

Figure 2:
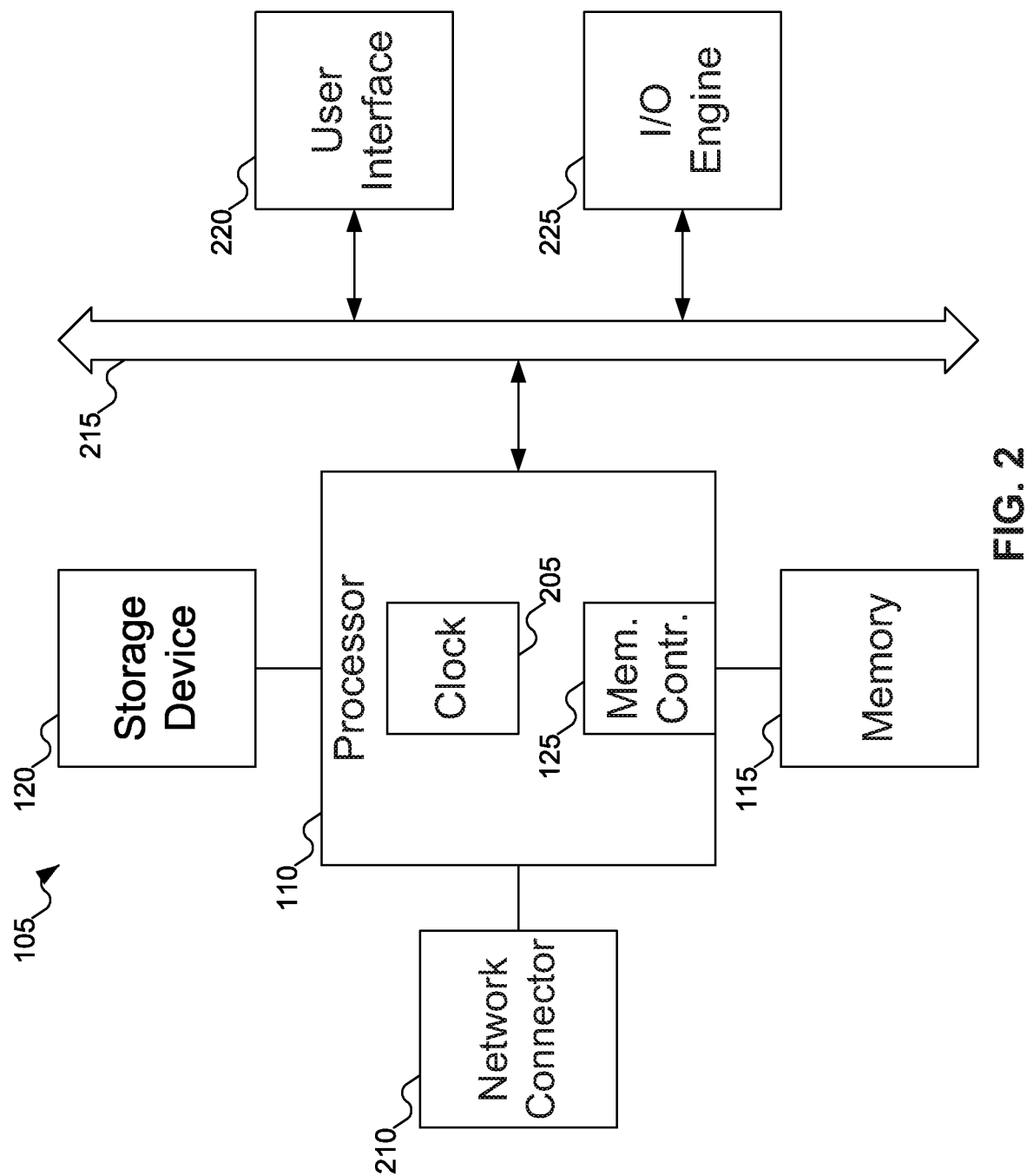
FIG. 2 shows details of the machine of FIG. 1, according to embodiments of the disclosure.

FIG. 2 shows details of machine 105 of FIG. 1, according to embodiments of the disclosure. In FIG. 2, typically, machine 105 includes one or more processors 110, which may include memory controllers 125 and clocks 205, which may be used to coordinate the operations of the components of the machine. Processors 110 may also be coupled to memories 115, which may include random access memory (RAM), read-only memory (ROM), or other state preserving media, as examples. Processors 110 may also be coupled to storage devices 120, and to network connector 210, which may be, for example, an Ethernet connector or a wireless connector. Processors 110 may also be connected to buses 215, to which may be attached user interfaces 220 and Input/Output (I/O) interface ports that may be managed using I/O engines 225, among other components.

Figure 3:
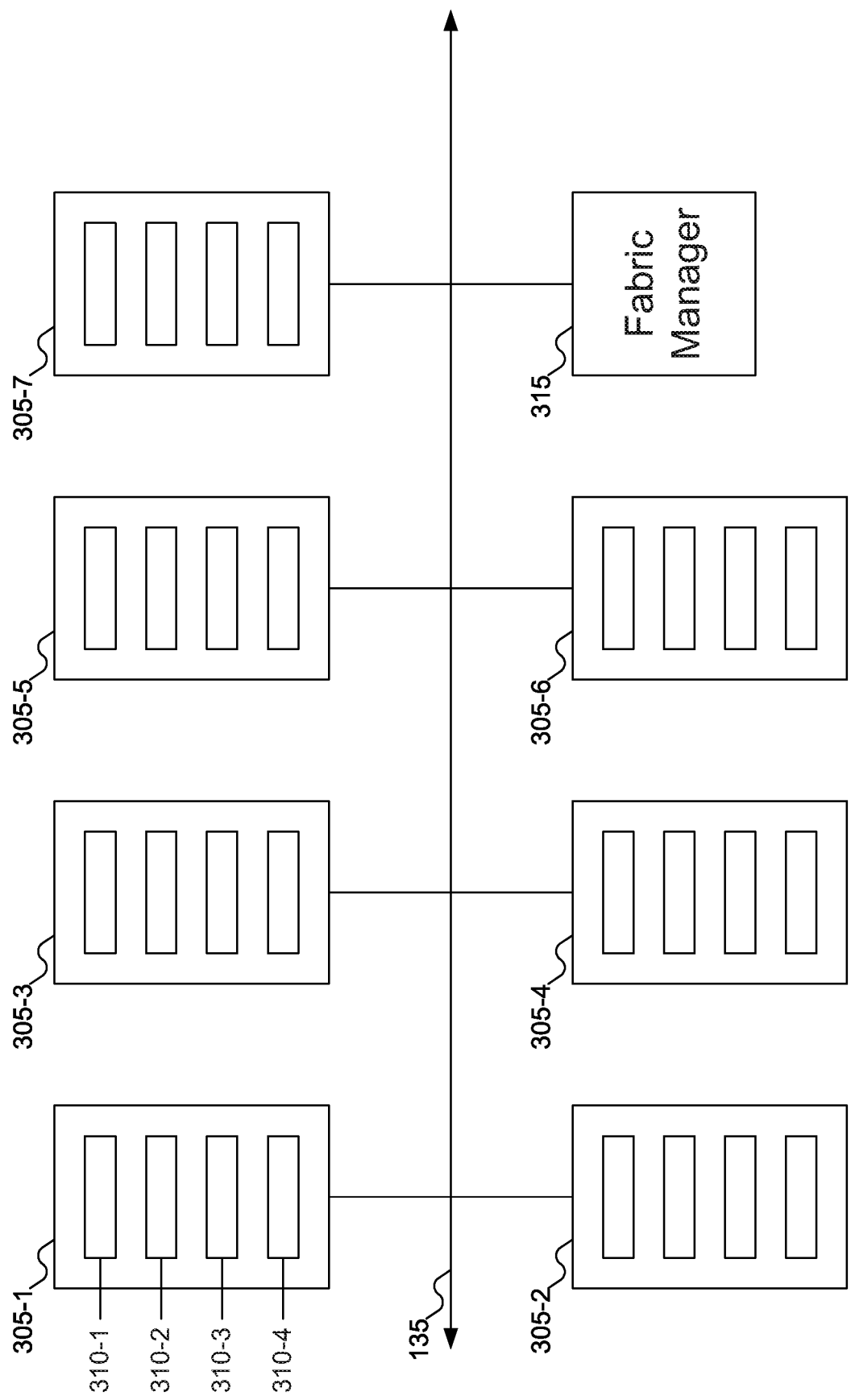
FIG. 3 shows an appliance that may be used as a pooled memory device in place of the machine of FIG. 1, according to embodiments of the disclosure.

FIG. 3 shows an appliance that may be used as a pooled memory device in place of machine 105 of FIG. 1, according to embodiments of the disclosure. In FIG. 3, various appliances 305-1 through 305-7, which may be referred to collectively as appliances 305, are shown, connected to network 135. As discussed above, appliances 305 may be machines such as machine 105 of FIG. 1, or devices designed to provide memory for applications running on machines 105 of FIG. 1 connected to network 135.

Consider appliances 305, for the moment, from the point of view of the memory they include. This memory may be either directly attached memory, available specifically to applications running on machine 105 of FIG. 1 that includes the directly attached memory (such as memory 115 of FIG. 1), or memory that may be used by applications running on other machines 105 of FIG. 1 connected to network 135. In some networks, the memory of an individual appliance 305 might be used by one application. That is, an application running on machine 105 of FIG. 1 might use the memory of appliance 305-1, but no other application, running on either machine 105 of FIG. 1 or any other machine connected to network 135, might use that memory while it is in use by the application. (Of course, once the application terminates, the memory it uses may be released and used by another application.) For example, if appliance 305-1 includes memory that may be divided into portions, such as portions 310-1 through 310-4 (which may be referred to collectively as portions 310), the application using the memory of appliance 305-1 might use all of portions 310.

In other networks, the memory of appliances 305 might be pooled. When memory is pooled, any application might request memory from any appliance. Thus, for example, a first application might be using portion 310-1, a second application might be using portions 310-2 and 310-4, and portion 310-3 might currently be available (that is, portion 310-3 might not currently be used by any application on network 135). These applications might also be using memory on other appliances 305: for example, the first application might also be using portions of the memory on appliance 305-4, and the second application might be using portions of the memory on appliances 305-2 and 305-6.

When memory is pooled, fabric manager 315 may manage the allocation of memory for applications. That is, when an application requests some memory, that request may be sent to fabric manager 315. Fabric manager 315 may then select from which appliance(s) 305 to allocate portion(s) of memory for use by that application, and may then provide the application information about what portion(s) of memory in what appliance(s) have been allocated to the application.

Because appliances 305 may connect to network 135, in some embodiments of the disclosure, appliances 305 may include an interface card, such as network connector 210 of FIG. 2, to connect to network 135, which may handle sending and/or receiving data across network 135 (which may be at a different layer than the protocol used for issuing requests to the memory in appliances 305). In other embodiments of the disclosure, sending and/or receiving data across network 135 may be handled by a controller of a storage device, in which case appliance 305 might not include a separate component that handles traffic across network 135.

Network 135 might be a portion of a larger network. For example, network 135 might consist of a switch—for example, a CXL switch—to which appliances 305 and fabric manager 315 are connected, and which may in turn connect to another network.

While FIG. 3 shows seven appliances 305 and one fabric manager 315, embodiments of the disclosure may include any number (one or more) of appliances 305, and/or any number (one or more) of fabric managers 315. In some embodiments of the disclosure, there may be one fabric manager 315 managing memory in two or more appliances 305.

As noted above, applications are increasing their demands for memory. Pooling the memory of appliances 305 may mean that the memory used by the application might reside in two or more appliances 305, and therefore a single appliance 305 is not expected to provide enough memory for the application. But if every application running on a machine connected to network 135 begins requesting more memory, then more memory would be needed: either by adding more memory to appliances 305 or by adding more appliances to network 135.

While increasing the available memory is viable, it also has costs. For example, assume that DRAM is used as the memory in appliances 305, and assume that DRAM costs $1.50 per gigabyte (GB). To purchase four terabytes (TB) of DRAM would cost $1.50/GB×4096 GB/TB $6000. Thus, adding more memory to appliances 305 may be an expensive (in terms of dollars) proposition.

If there were a way to compress the data stored in the memory, it might be possible to reduce the amount of memory needed to support the applications running on the machine on network 135. For example, if the data might be compressed by 25%, four TB of data might fit into three TB of memory. By purchasing only three TB of DRAM instead of four TB, approximately $1500 might be saved. When multiplied by the number of appliances 305 across network 135, this savings may be significant.

When data is stored uncompressed, fabric manager 315 may know exactly how much memory is available within appliances 305. For example, if fabric manager 315 has allocated one TB of memory of appliance 305-1, and appliance 305-1 has four TB of DRAM installed, fabric manager 315 may know that there are three TB of DRAM available to be used by other applications.

But when data is stored compressed in the memory of appliances 305, fabric manager may not know exactly how much memory is really available, since the "available" memory may depend on the compression applied to the data. For example, assume that appliance 305-1 only includes three TB of DRAM, and the data stored there is stored in a compressed format. If the application requests and is allocated "one TB" of DRAM, the actual amount of DRAM used by the application may depend on how the data is compressed. If the data is highly compressible—for example, the data is sparse of repeating, and the data may be compressed to 50% of its uncompressed size, then the application is effectively using only 500 GB of memory in appliance 305-1. But if the data is not very compressible—for example, the data may only be compressed by 5%, reducing its size to 95% of its uncompressed size—then the application is effectively using 950 GB of memory in appliance 305-1. And if the data is not compressible at all, then the application is effectively using one TB of memory in appliance 305-1. This analysis shows that the actual amount of memory in appliance 305-1 that the application uses depends on how compressible the data is.

But the point of compressing the data in the memory in appliance 305-1 is to let fabric manager 315 offer "more" memory than appliance 305-1 actually holds. For example, fabric manager 315 would want to advertise appliance 305-1 as holding four TB of memory, even though appliance 305-1 holds only three TB of actual memory, with the "additional" memory made available through compression. If fabric manager 315 assumes that all data may be compressed by 25% and operates as though appliance 305-1 includes four TB of memory, and if the data stored in the memory of appliance 305-1 is not actually compressible by 25%, one or more applications might find that they do not actually have as much memory as they requested of fabric manager 315.

As this is an undesirable outcome, in embodiments of the disclosure appliances 305 may include some additional storage. That way, in the worst case scenario (where no data is compressible), appliances 305 may still store all the data provided by the applications using the memory in appliances 305. But since DRAM is expensive, a different form of storage may be used instead.

In some embodiments of the disclosure, another form of storage may be used as protection against the memory of appliances 305 overflowing due to data not being as compressible as hoped. For example, a low latency not-And (NAND) flash storage may be used. Assume that low latency NAND flash storage, costs $0.27 per GB. Then one TB of low latency NAND flash storage would cost $0.27/GB× 1024 GB/TB≈$300. Thus, the overall cost for four TB of memory in appliance might be approximately $4500+ $300≈$4800: still saving approximately $1200. (As appliances 305 might now use both DRAM and low latency NAND flash storage—two different forms of storage—there may be also some added complexity in the controller that manages reading data from and/or writing data to DRAM and low latency NAND flash storage. But the costs associated with a more complex controller are relatively small.) Alternatives to low latency NAND flash storage may include, for example, Phase-Change Memory (PCM), Resistive RAM (RRAM), or Magnetoresistive RAM (MRAM).

Because the other storage, such as low latency NAND flash storage, might still be used as memory in appliance 305, the form of storage selected and used in appliance 305 may be compatible with being used as memory. Low latency NAND flash storage may be used because, while it has a higher latency than DRAM, data access is still relatively fast, and the added delay of reading data from and/or writing data to the low latency NAND flash storage should not adversely affect applications running on machines on network 135.

In the remainder of this document, a reference to the memory of appliance 305 is intended to refer to the available storage of appliance 305. In some embodiments of the disclosure, compression/decompression of data may be applied to data stored in DRAM, and data stored in low latency NAND flash storage may be stored uncompressed; in other embodiments of the disclosure, compression/decompression of data may be performed regardless of where the data is stored in memory. In still other embodiments of the disclosure, some or all of the data stored in DRAM may be stored uncompressed.

Compressing data in the memory of appliances 305 may also introduce other issues that may be addressed. First, because the data is compressed, the data might not be stored at the address used by the application. For example, assume that the application has been assigned memory addresses in the range 0x8000 0000 to 0xFFFF FFFF in the DRAM of appliance 305-1. If the appliance 305 only include three TB of DRAM, then addresses in the range 0xC000 0000 to 0xFFFF FFFF are not valid addresses in the DRAM. The solution is to map addresses from the host address (the memory address used by the application) to the device address (where the data is stored on the device). (Note that depending on the form the memory of appliances 305 may take, the storage itself may involve another layer of translation. For example, SSDs may include a translation map, that maps a logical address provided by to the SSD to the physical address where the data is actually stored. This arrangement means that the SSD may move data around without having to inform the application that the physical address of the data has changed. In some embodiments of the disclosure, the address mapping to support compression may be performed outside the SSD, in which case the device address may map to another logical address rather than a physical address on the SSD.) But if the address mapping does not require large amount of storage, then the storage of the address mapping may be taken from the space saved by compressing the data.

Another issue that may be introduced by compression is latency. Compressing (and, more importantly, decompressing) data may take time. The time required to compress/decompress data, depending on the compression algorithm implemented, may be proportional to the size of the data being compressed: the larger the size of the data to be compressed/decompressed, the longer compression/decompression may take. But note that the "size" of the data being compressed is not intended to refer to the overall amount of data, but rather the size of the unit of compression/decompression for the compression algorithm. Thus, for example, the data might be one megabyte (MB) in size, but the unit of compression/decompression might be 4 kilobytes (KB) in size. Therefore, implementing compression algorithms that operate on relatively small units: for example, 64-256 bytes (B), may minimize the latency involved in compression/decompression. And if the application in question is not on appliance 305 that stores the data, the latency associated with network traffic may make the latency of compression/decompression marginal.

While the above analysis focuses on DRAM and low latency NAND flash storage, embodiments of the disclosure may use any desired forms of storage to act as the memory of appliances 305. In addition, while the above analysis considers using both volatile storage (DRAM) and non-volatile storage (low latency NAND flash storage), embodiments of the disclosure may use an alternative volatile storage in place of the low latency NAND flash storage.

Figure 4:
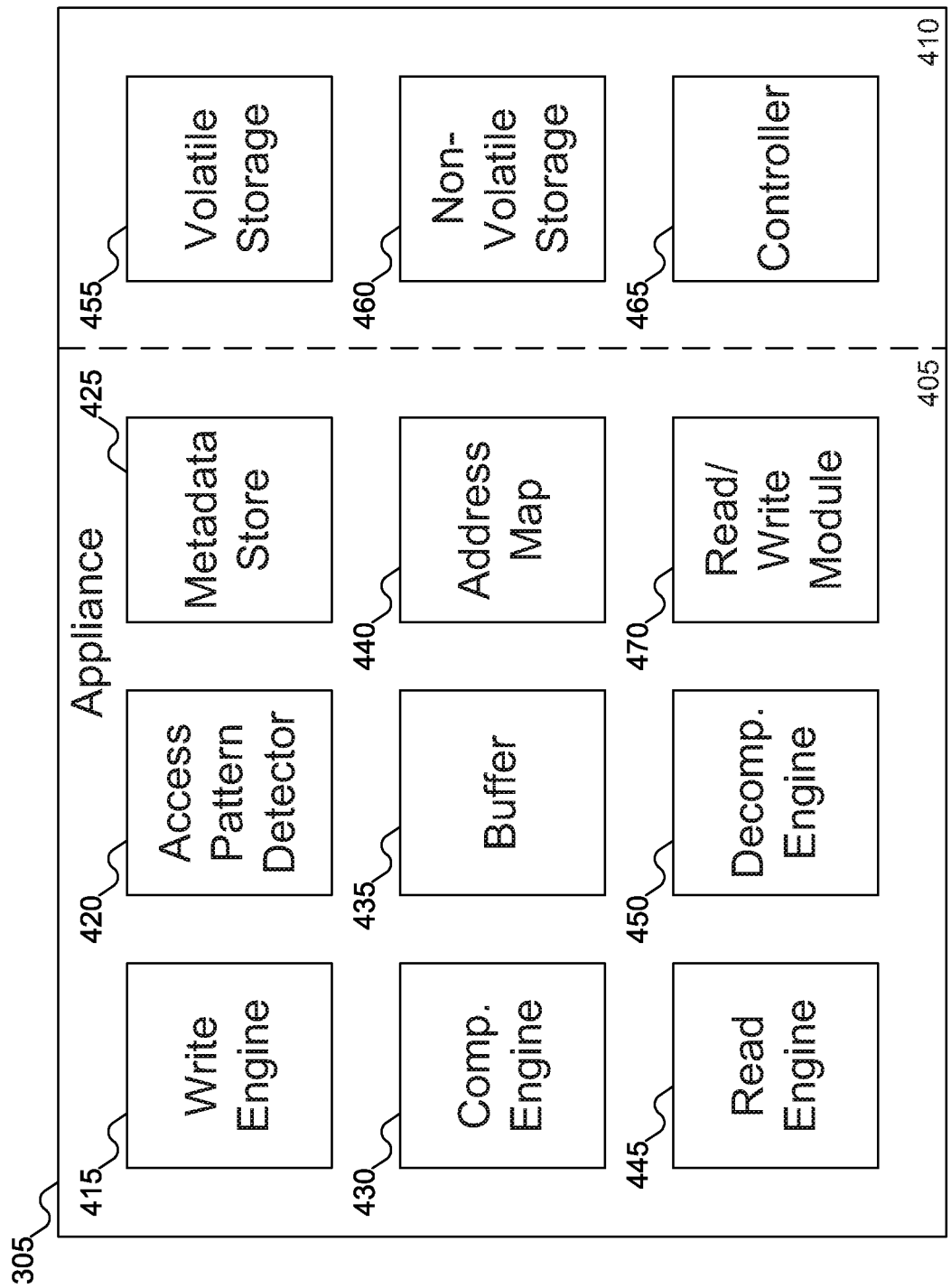
FIG. 4 shows details of the appliance of FIG. 3, according to embodiments of the disclosure.

FIG. 4 shows details of appliance 305 of FIG. 3, according to embodiments of the disclosure. In FIG. 4, appliance 305 is shown divided into two portions 405 and 410. This division of appliance 305 into portions 405 and 410 is not intended to suggest that appliance 305 is physically divided into two portions. Instead, this division of appliance 305 into portions 405 and 410 is intended to separate different functionalities, with portion 405 representing the components responsible for the functionality of embodiments of the disclosure and portion 410 representing the storage device components responsible for reading data from and writing data to the various storage elements.

In portion 405 of appliance 305, various components are shown. Write engine 415 may receive a write request from an application. The write request may include data that is to be written to the memory in appliance 305. The write request may also include an address (which may be referred to as a host address or a logical address) used by the application to refer to the data. Note that at this point, the application may have already requested some of the memory of appliance 305 be allocated to it: the write request may therefore be an attempt to store data in the memory of appliance 305.

Access pattern detector 420 may be used to determine an access pattern—a locality of access—for the data. Because appliance 305 may be used to store any type of data, it may not be possible to know in advance what type of data is being stored in appliance 305. For example, the data being stored in appliance 305 might be part of a machine learning or artificial intelligence workload, audio data, vibration data, time-series data, sensor data, text data, image data, or random data, among other possibilities. Access pattern detector 420 may attempt to determine how the application accesses the data. For example, the application might access data sequentially: after accessing one page of data, the application may be likely to access the next page of data in order. Or, the application might access data using a tile access pattern—for example, a four-by-four or eight-by-eight grid of data points—as might happen with image or video data. In that case, there might still be an order to the access pattern, but the data might not be accessed in a linear manner. By attempting to determine the access pattern for the data, appliance 305 may be able to identify which type of compression algorithm might be best suited to compress the data, as different types of data may be compressible to different extents, and might be best compressed using varying compression algorithms.

Once an access pattern has been determined for the data, that access pattern may be stored in metadata store 425, so that the access pattern may be used again later: for example, in selecting a compression algorithm to be applied to the data. Metadata store 425 is discussed further with reference to FIG. 5 below.

If an access pattern is already stored in metadata store 425, in some embodiments of the disclosure, write engine 415 might access the access pattern from metadata store 425, rather than applying access pattern detector 420 anew. This approach may be useful, for example, if the application sends multiple write requests for various portions of a large data: if an access pattern has already been determined for the data, testing data from later write requests might not be necessary.

Compression engine 430 may be used to compress the data. If a particular compression algorithm is already known to be best suited for the data, then compression engine 430 may simply use that compression algorithm. Otherwise, compression engine 430 may make a best guess as to which compression algorithm might work, using information from access pattern detector 420. Compression engine may implement one or more different compression algorithms. For example, the Lempel-Ziv-Oberhumer (LZO) compression algorithm or the LZ4 compression algorithm may be suitable for compressing text data, delta+entropy in one-dimensional space may be suitable for compressing time-series data, audio data, vibration data, or sensor data, and delta+entropy in two-dimensional space may be suitable for compressing image data. In the absence of information about what type of data is being compressed, the access pattern determined by access pattern detector 420 may provide a guide to what compression algorithm to use.

Each of these algorithms may operate on relatively small units of data: 64-256 B for LZO, LZ4, and delta+entropy in one-dimensional space, and four-by-four or eight-by-eight pixel grids for delta+entropy in two-dimensional space, which may help minimize the latency added by inline compression/decompression of data. Compression engine 430 may also implement additional compression algorithms not described herein, as well as other ways to reduce the storage requirements of data in the memory of appliance 305. For example, compression algorithm 430 may implement data deduplication as a form of compression (since data that is written multiple times may actually be stored only once).

If compression engine 430 does not already know what compression algorithm to apply, in some embodiments of the disclosure, compression engine 430 may test out various different compression algorithms to determine which compression algorithm works best. That is, compression engine 430 may attempt to compress the data in the write request using one or more different compression algorithms, and may select the compression algorithm that produces the best compression ratio (that is, the compression algorithm that results in the smallest data size for the compressed data). Note that compression engine 430 may test one, some, or all compression algorithms implemented by compression engine 430. For example, if access pattern detector 420 indicates that the data is image data, there may be little point in attempting to compress the data using a compressing algorithm that works best on sparse data or text data.

In some embodiments of the disclosure, fabric manager 315 of FIG. 3 may provide a hint regarding the workload of the data. That is, fabric manager 315 of FIG. 3 may have some information about what the application is designed to do, and may provide this information to compression engine 430, which may, like the access pattern for the data, reduce the number of compression algorithms to be tested by compression engine 430. Fabric manager 315 of FIG. 3, the operating system kernel, and/or various specifications may be modified to support fabric manager 315 of FIG. 3 providing a workload hint to appliance 305: for example, by using vendor-unique field.

The above description implies that all of the data included with the write request is tested for compression. In some embodiments of the disclosure, compression engine 430 may actually test all the data to see how best to compress it. But if the data to be written is large relative to the unit of compression, such an approach may not be efficient. For example, consider the situation where the application wants to store a 4 KB page in the memory of appliance 305. If the unit of compression is 256 B, then there are 4096 B÷256 B=16 different chunks of data to compress. Testing each chunk against, say, four compression algorithms, each of which may take 30 nanoseconds (ns), might require 16×4× 30 ns≈2000 ns. While 2000 ns might not seem like a significant amount of time, with a desired target of 100 ns to access data from DRAM, the time required to perform compression testing may have a significant impact. Even with practical DRAM access around 500 ns, a 2000 ns delay may be considered significant. Thus, in some embodiments of the disclosure, compression engine 430 might only perform compression testing on one compressible unit of data, or a sampling of compressible units of data, rather than testing all of them.

If only one compressible unit of data is tested by compression engine 430, then the compression algorithm considered the best for that unit may then be used for all compressible units in the data. If more than one compressible unit of data is tested by compression engine 430, then in some embodiments of the disclosure, the compression algorithm that provides the best result for a majority or plurality of the compressible units may be applied to the data as a whole. In other embodiments of the disclosure, each compression algorithm may be given a weight for each tested compressible unit based on how well that compression algorithm compressed that unit, and the compression algorithm with the highest weighted average may be selected.

If each compressible unit of the data is tested for optimal compression separately, then compression engine 430 may also apply different compression algorithms to different compressible units of the data.

Regardless of how a compression algorithm is selected for the data, this information may be stored in metadata store, so that it may be used again later: for example, to be applied in compressing other units in the data, or other related data that may be received from the application. If different compression algorithms are applied to different compressible units in the data, that information may also be stored in metadata store 425 as a compression type (an indicator of what compression algorithm was applied to the data).

If a compression type is already stored in metadata store 425, in some embodiments of the disclosure, write engine 415 might access the compression type from metadata store 425, rather than using compressing engine 430 to determine the best compression algorithm anew using compression engine 430. This approach may be useful, for example, if the application sends multiple write requests for various portions of a large data: if a compression algorithm has already been selected for the data, testing data from later write requests might not be necessary.

In some embodiments of the disclosure, compression engine 430 may operate as data is received, compressing data as fast as it arrives (or as fast as possible when data arrives, since there may be some operations needed to determine which compression algorithm to use for new data). In other embodiments of the disclosure, data may be arriving too fast for appliance 305 to keep up, or compression engine 430 may need additional time to test out various compression algorithms. In such embodiments of the disclosure (or when specifically needed), compression engine 430 may perform compression (testing for the appropriate compression algorithm and/or actually compressing the data) as a background operation, so as to minimize interference with other operations, such as reading data from the memory of appliance 305. In such situations, the data may be stored somewhere until compression engine 430 may complete is operations on the data.

In some embodiments of the disclosure, the data may be stored temporarily in buffer 435. Buffer 435 may be a high-speed memory, such as an SRAM or a cache of some sort, so that data may be written and read as quickly as possible (again, to minimize the impact on other operations of appliance 305). Compression engine 430 may test compression algorithms against the data (or compressible units of the data) while the data sits in buffer 435, and/or compress the data while the data sits in buffer 435. Once the data is compressed, compression engine 430 may transfer the data to the memory of appliance 305.

In other embodiments of the disclosure, buffer 435 may be omitted, and compression engine may operate on the data as stored in the memory of appliance 305. That is, the data may be written to an address (which may be the host address provided with the write request, or may be a different address) in the memory of appliance 305. Compression engine 430 may then compress the data in the memory of appliance 305, and may, if appropriate, relocate the data to a different address. For example, the data might be written to a reserved portion of DRAM or low latency NAND flash storage in appliance 305 for compression, then copied to the target destination address in the DRAM after compression is complete.

Normally, when an application provides a host address with a write request, the application expects that the data will be stored at that address in the memory of appliance 305. But as discussed above, although the write request might include a host address, the data might not be written to that actual address. This change of address for the data may be because the host address is not available (it is an address that does not exist in DRAM, or that address in the DRAM might already be storing some data), or it might be because, due to compression, the address range provided to the application might map to a different range of addresses in DRAM. Regardless of the reason, the data might be stored at an address in DRAM (which may be referred to as a device address) other than the host address provided with the write request. Thus, to be able to later retrieve the data, appliance 305 may store a map from the host address to the device address. Address map 440 may store this mapping. Address map 440 is discussed further with reference to FIG. 6 below.

Aside from writing data to appliance 305, applications may also want to read data from appliance 305. Read engine 445 may receive a read request from an application. The read request may include a host address where the application thinks the data is stored. Read engine 445 may determine the device address where the data is actually stored using address map 440, and may determine the compression type of the data from metadata store 425. In some embodiments of the disclosure, read engine 445 may also determine the access pattern of the data, either by reading the access pattern from metadata store 425 or by applying access pattern detector 420 (the way the data is read might differ from the way the data is written, and might impact future compression of updated data, in which case the access pattern in metadata store 425 for the data may be updated).

Once the device address where the data is stored and the compression type of the data is known, decompression engine 450 may read the data from the device address in the memory of appliance 305 and decompress it according to the compression type. As with compression, in various embodiments of the disclosure decompression may be performed inline, using buffer 435 as a staging area for the data to be decompressed, or by decompressing the data within the memory of appliance 305 (either at the device address, the host address, or some other address in the memory of appliance 305).

But there is also another possibility to consider. If the data was written sufficiently recently, the data might already be present in buffer 435 (if compression engine 430 has not yet had time to perform background compression and/or storage of the compressed data in the memory of appliance 305). In such situations, read engine 445 (or decompression engine 450, if the data is compressed in buffer 435) might access the data directly from buffer 435, without having to access the memory of appliance 305.

In some embodiments of the disclosure, compression engine 430 and decompression engine 450 may be separate components, as shown. But in other embodiments of the disclosure, compression engine 430 and decompression engine 450 may be combined into a single engine that performs both compression and decompression of the data. Such an implementation may be simpler, avoiding the need to implement separate compression and decompression (particularly where a compression algorithm and its corresponding decompression algorithm may be inverse functions).

In portion 410 of appliance 305, other components are shown. Volatile storage 455 may be a volatile form of storage, such as DRAM. Non-volatile storage 460 may be a non-volatile form of storage, such as low latency NAND flash storage. Together, volatile storage 455 and non-volatile storage 460 may form the memory of appliance 305. Controller 465 may manage the reading from and writing data to volatile storage 455 and non-volatile storage 460.

In some embodiments of the disclosure, data stored in non-volatile storage 460 may be compressed. But because non-volatile storage 460 may be slower to access than volatile storage 455, and because non-volatile storage 460 might be used only when compression is insufficient to store the entire amount of data offered by appliance 305 in volatile storage 455, in some embodiments of the disclosure, data stored in non-volatile storage 460 may be stored uncompressed. In such embodiments of the disclosure, if write engine 415 is able to determine that the data might not fit, even when compressed, into volatile storage 455, write engine 415 might bypass using access pattern detector 420 or compression engine 430, and just store the data uncompressed in non-volatile storage 460. (Access map 440 may be updated, if appropriate, to indicate where the data is stored in non-volatile storage 460.)

In some embodiments of the disclosure, appliance 305 may be implemented as a single machine as shown; in other embodiments of the disclosure, portion 410 may be implemented in storage device 120 of FIG. 1, and portion 405 may be implemented elsewhere: for example, in network interface card 210 of FIG. 2 or another component that may be located between network 135 and storage device 120, and therefore may perform compression/decompression inline. Portion 405 may even be implemented, in part or in whole, within fabric manager 315 of FIG. 3: for example, appliance 305 might include all the components shown except for address map 440, which might be implemented within fabric manager 315 of FIG. 3.

In some embodiments of the disclosure, compression engine 430 may directly write data to the memory of appliance 305, and decompression engine 450 may directly read data from the memory of appliance 305. In such embodiments, compression engine 430 and decompression engine 450 may bypass controller 465 (in which case controller 465 may be omitted) or may communicate with controller 465 to complete a write or read request. In other embodiments of the disclosure—for example, embodiments of the disclosure where portion 405 is not integrated with portion 410 with appliance 305—some communication between portions 405 and 410 may be needed. In such embodiments of the disclosure, read/write module 470 may manage communication with controller 465 to read and/or write the compressed data to volatile storage 455 and/or non-volatile storage 460.

In some embodiments of the disclosure, the components shown in appliance 305 may be implemented in hardware within appliance 305: such hardware may include, for example, a Field Programmable Gate Array (FPGA), an Application-Specific Integrated Circuit (ASIC), a System-on-a-Chip (SoC), a Graphics Processing Unit (GPU), a General Purpose GPU (GPGPU), a Tensor Processing Unit (TPU), a Neural Processing Unit (NPU), a Central Processing Unit (CPU), or any combination thereof. In addition, different components may be implemented in different ways. Further, different components may be implemented using common hardware: for example, the components shown in portion 405 might be implemented as part of controller 465. In other embodiments of the disclosure, various components may alternatively be implemented in software, stored in firmware and running on a processor (not shown in FIG. 4). While software implementations may offer more generality and expandability, hardware implementations may be faster, which may affect the latency of appliance 305. Some components, such as volatile storage 455 and non-volatile storage 460, may typically be implemented in hardware, as software implementations of such components might not be practical.

FIG. 5 shows details of information that may be stored in metadata store 425 of FIG. 4, according to embodiments of the disclosure. In FIG. 5, table 505 is shown. Table 505 is shown as including three entries 510-1 through 510-3 (which may be referred to collectively as entries 510), but embodiments of the disclosure may include any number of entries 510. Each entry 510 may include data for columns, such as host address 515, access pattern 520, and compression type 525. Host address 515 may store the host address provided by the application when writing the data to appliance 305 of FIG. 3.

In some embodiments of the disclosure, host address 520 may be the host address associated with the write request. That is, even if the size of the data to be written is larger than the compressible unit, there might be only one entry in table 505 for all of that data. This approach may help keep the size of metadata size 425 of FIG. 4 at a minimum. In other embodiments of the disclosure, if the data being written is larger than the compressible unit size, there may be entries 510 for each compressible unit or some multiple thereof (for example, the size of a page in the memory of appliance 305 of FIG. 3). This approach may support the use of different compression algorithms for different portions of the data, if each such unit might benefit from a different compression algorithm. For example, if the overall data does not have any particular access pattern, but portions of the data do have regular access patterns, those portions might benefit from compression even if compression might not be applicable to the data as a whole.

Access pattern 520 may encode the type of access pattern associated with the data. This access pattern 520 may be sequential (one-dimensional), tiled (two-dimensional), or random, among other possibilities. Thus, for example, entry 510-1 may indicate that the data associated with host address 0xC000 0000 has sequential data access, whereas entry 510-3 may indicate that the data associated with host address 0x8000 0000 is random access data.

Compression type 525 may encode the compression algorithm used to compress the data. Thus, for example, entry 510-2 may indicate that the data associated with host address 0xA000 0000 is compressed using delta+entropy in two dimensional space, whereas entry 510-3 may indicate that the data is not compressed at all. Note that these compression algorithms may correspond to access patterns 520: data with a tiled access pattern may represent image data that may be compressed accordingly, whereas data that is randomly accessed might not be compressible at all.

In some embodiments of the disclosure, there may be an association between access pattern 520 and compression type 525. That is, for a particular access pattern, a particular compression type is always used. In such embodiments of the disclosure, both access pattern 520 and compression type 525 might not be needed: one might imply the other. But in other embodiments of the disclosure, there may be multiple compression algorithms that might be used for a given access pattern, and which compression algorithm works best might vary depending on the actual data. In such embodiments of the disclosure, it may be useful to track both access pattern 520 and compression type 525.

While FIG. 5 suggests that each entry 510 in table 505 might require six bytes (four bytes for host address 515, and one byte each for access pattern 520 and compression type 525), embodiments of the disclosure might support storing table 505 using less data. For example, if table 505 includes an entry for, say, each page in the memory of appliance 305, then host address 515 may be omitted: all that is needed is to locate the appropriate entry for a given host address, which might be accomplished by dividing the host address by the size of a page in the memory of appliance 305 of FIG. 3. And because the number of access patterns and compression types may be relatively small, only a few bits may be used to encode access pattern 520 and/or compression type 525.

It might be argued that including an entry 510 for each page in the memory of appliance 305 defeats the purpose of not including host address 515 in table 505. For example, if appliance 305 of FIG. 3 includes 4 TB of memory and each page is 4 KB in size, there might be 1,000,000,000 entries in table 505. But table 505 would be a sparse table, with relatively few entries including data. Thus, table 505 may be stored in a compressed format, which might offset for the number of entries 510 in table 505.

FIG. 6 shows details of address map 440 of FIG. 4, according to embodiments of the disclosure. In FIG. 5, address map 440 is shown as including three entries 605-1 through 605-3 (which may be referred to collectively as entries 605), but embodiments of the disclosure may include any number of entries 605. Each entry 605 may include data for columns, such as host address 515, and device address 610. Host address 515 may be the same as host address 515 in FIG. 5. Device address 610 may be the device address where the data is actually stored in the memory of appliance 305 of FIG. 3. Thus, for example, entry 605-1 may indicate that the data associated with host address 0xC000 0000 may actually be stored in the memory of appliance 305 of FIG. 3 at device address 0xA000 0000, entry 605-2 may indicate that the data associated with host address 0xD000 0000 may actually be stored in the memory of appliance 305 of FIG. 3 at device address 0xD000 0000, and entry 605-3 may indicate that the data associated with host address 0x8000 0000 may actually be stored in the memory of appliance 305 of FIG. 3 at device address 0x4000 0000.

There are some interesting points to notice in FIG. 6. First, as shown with entry 605-2, it is possible for the data to be stored at the host address. This might happen by coincidence, or it might happen by design. For example, if data is not compressible, it may be simpler to store the data at the host address, rather than mapping the host address to a different device address. In some embodiments of the disclosure, such entries (that map a host address to the same device address) may be omitted from address map 440: the absence of an entry for a given host address may then be interpreted as indicating that the host address is not mapped.

Second, while entry 510-3 of FIG. 5 indicated that the data stored at host address 0x8000 0000 was not compressible, entry 605-3 indicates that the data is mapped anyway. This fact shows that data may be mapped even if the data is not compressible (and might be expected to be stored at the given address).

Figure 7:
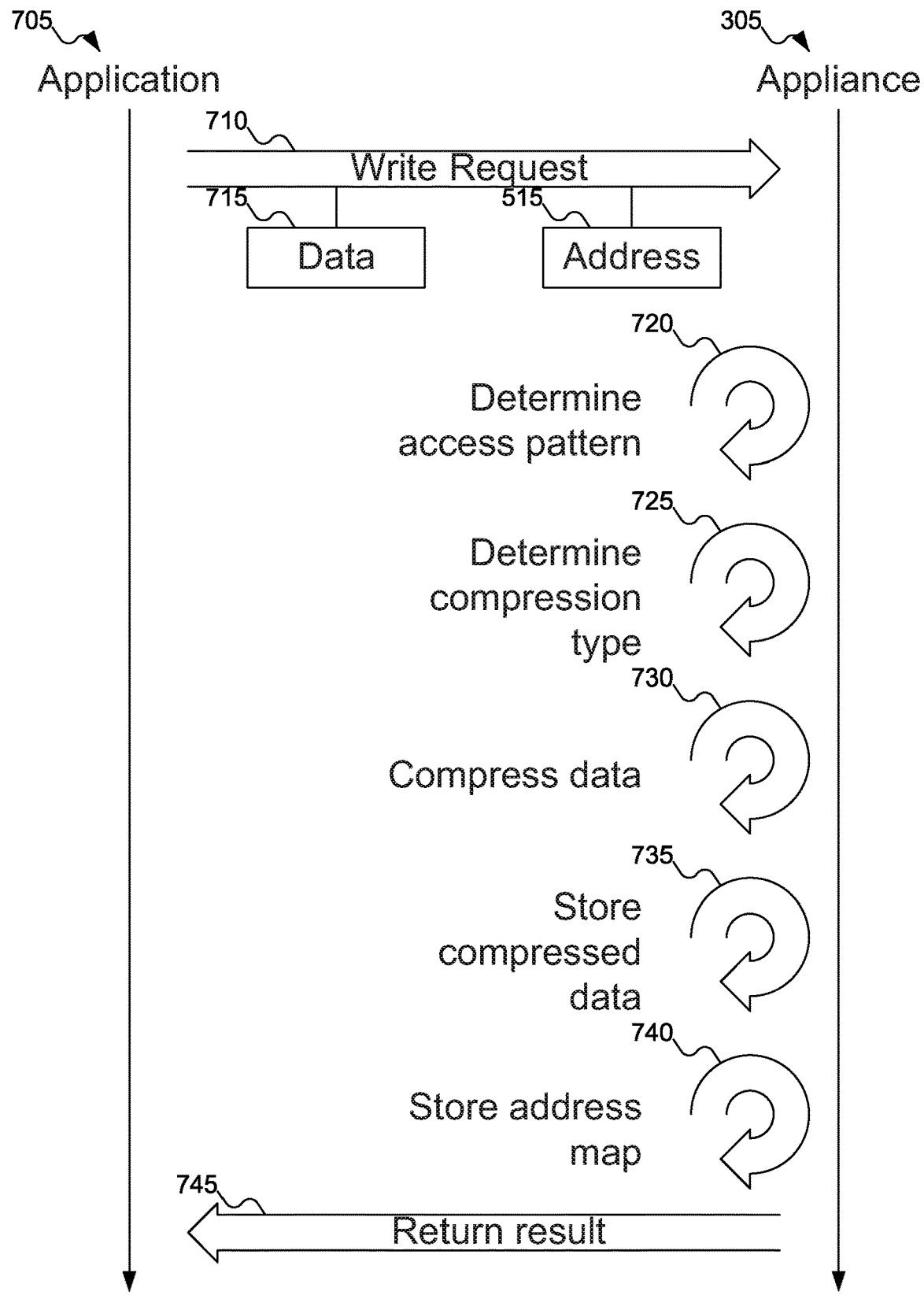
FIG. 7 shows operations performed by the appliance of FIG. 3 to process a write request from an application, according to embodiments of the disclosure.

FIG. 7 shows operations performed by appliance 305 of FIG. 3 to process a write request from an application, according to embodiments of the disclosure. In FIG. 7, application 705 may send write request 710 to appliance 305. Write request 710 may include data 715 and host address 515. Appliance 305 may then determine access pattern 520 of FIG. 5 for the data (operation 720), determine compression type 525 of FIG. 10 for the data (operation 725), compress the data according to the compression type (operation 730), store the compressed data in memory (operation 735), and store the mapping of host address to device address in address map 440 of FIG. 4 (operation 740). (Not shown in FIG. 7 is appliance 305 storing access pattern 520 of FIG. 5 or compression type 525 of FIG. 5 in metadata store 425 of FIG. 4.) Finally, at operation 745, appliance 305 may return result 745 to application 705, indicating that the data was successfully written. Note that result 745 may be omitted in some embodiments of the disclosure, and application 705 might assume that write request 710 successfully completed.

Figure 8:
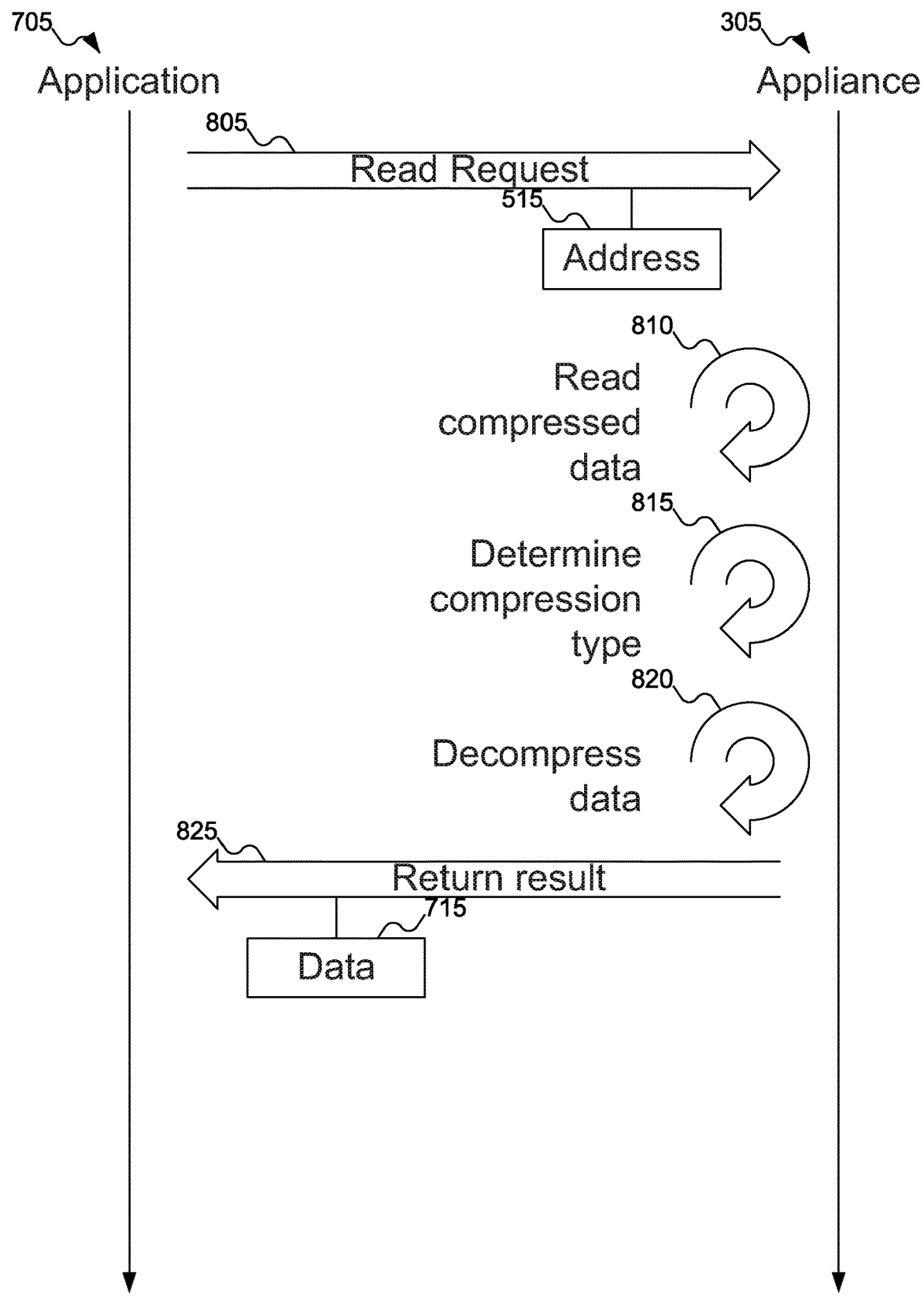
FIG. 8 shows operations performed by the appliance of FIG. 3 to process a read request from the application of FIG. 7, according to embodiments of the disclosure.

FIG. 8 shows operations performed by appliance 305 of FIG. 3 to process a read request from application 705 of FIG. 7, according to embodiments of the disclosure. In FIG. 8, application 705 may send read request 805 to appliance 305. Read request 805 may include host address 515. Appliance 305 may then read the compressed data from memory (operation 810), determine the compression type (operation 815), and decompress the data according to the compression type (operation 820). Finally, at operation 825, appliance 305 may return data 715 to application 705.

Note that data 715, in both FIGS. 7 and 8, might be larger than the unit of data to which compression is applied. For example, the unit of data to which compression is applied might be 256 B, but data 715, either as written in FIG. 7 or as read in FIG. 8, might be 4 KB. In other words, to write or read data 715, appliance 305 might have to perform certain operations multiple times. Thus, for example, operation 730 of FIG. 7 might be applied multiple times to compress each individual compressible unit of data in data 715 of FIG. 7, or operation 820 of FIG. 8 might be applied multiple times to decompress each individual compressible unit of data in data 715 of FIG. 7. Such multiple compression/decompression operations might be performed in parallel using multiple compression engines 430 of FIG. 4/decompression engines 450 of FIG. 5, to reduce latency. As discussed below with reference to FIG. 9, appliance 305 might be able to determine in advance how many units of data may require compression/decompression in advance, allowing parallel compression/decompression to be scheduled.

Figure 9:
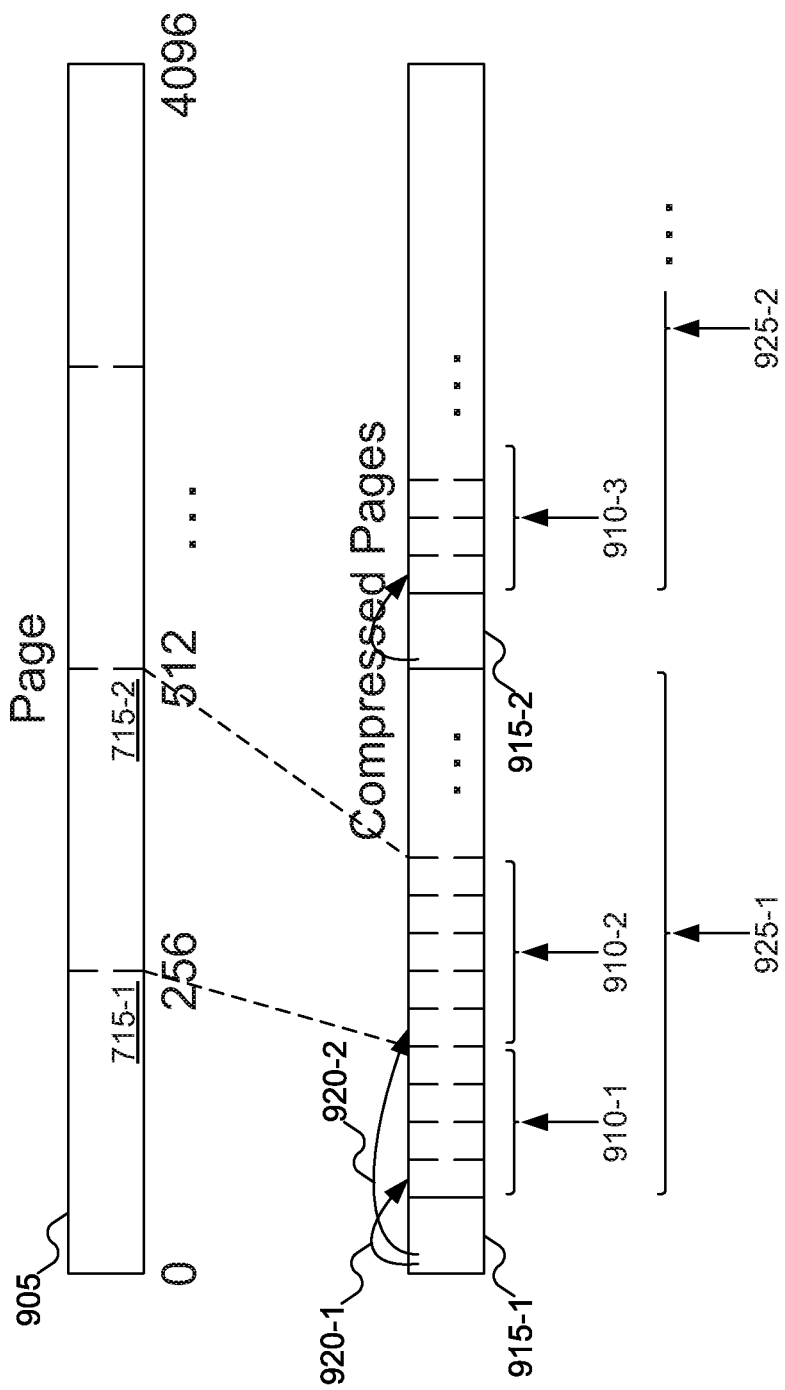
FIG. 9 shows details of how a page in the memory of the appliance of FIG. 3 may be compressed, according to embodiments of the disclosure.

FIG. 9 shows details of how a page in the memory of appliance 305 FIG. 3 may be compressed, according to embodiments of the disclosure. In FIG. 9, page 905 is shown. In FIG. 9, page 905 is 4 KB in size, but embodiments of the disclosure may support any size page.

Page 905 may be divided into units of data 715-1, 715-2, and so on (which may be referred to collectively as data 715 or units of data 715). Each unit of data 715 may be a compressible unit. In FIG. 9, each unit of data 715 is 256 B in size, but embodiments of the disclosure may support any size unit of data.

Each unit of data 715 may be compressed according to a compression algorithm. As discussed with reference to FIG. 4 above, in some embodiments of the disclosure, each unit of data 715 in page 905 may be compressed using the same compression algorithm; in other embodiments of the disclosure, different units of data 715 may be compressed using different compression algorithms. In FIG. 9, unit of data 715-1 may be compressed to compressed data 910-1, and unit of data 715-2 may be compressed to compressed unit of data 910-2 (compressed units of data 910-1 and 910-2 may be referred to collectively as compressed units of data 910 or compressed units 910).

As may be seen, compressed units 910-1 and 910-2 may differ in size. This difference may be a consequence of using different compression algorithms, different levels of compressibility of units of data 715, or other factors. Compressed units 910 may be packed into an amount of space that is a multiple of some size chunk. For example, compressed unit 910-1 is shown as packed into four chunks, whereas compressed unit 910-2 is shown as packed into five chunks. If a compressed unit 910 does not fit into an integer number of chunks (that is, the size of compressed units 910 is not an integer multiple of the size of an individual chunk), then the compressed unit 910 may be padded to fit into an integer number of chunks. Thus, for example, if each chunk is 16 B, compressed unit 910-1 may be anywhere from 49 B to 64 B in size, and compressed unit 910-2 may be anywhere from 65 B to 80 B in size.

Header 915-1 may also be established. Header 915-1 may identify where each compressed unit starts. Thus, for example, header 915-1 may include pointer 920-1 (which may be an offset of some number of chunks) to the chunk where compressed unit 910-1 begins (in FIG. 9, this pointer/offset may be zero to indicate that compressed unit 910-1 begins at the first chunk), pointer 920-2 to the chunk where compressed unit 910-2 begins (in FIG. 9, this pointer/offset may be fore to indicate that compressed unit 910-2 begins at the fifth chunk), and so on. Header 915-1 may be relatively small: in some embodiments of the disclosure, header 915-1 may be 32 B in size, but embodiments of the disclosure may have header 915-1 be any other size.

Thus, page 905 may be compressed down to compressed page 925-1. As a result, the space needed to store (uncompressed) page 905 has room for additional data, which may be compressed page 925-2, with its compressed units, such as compressed unit 910-3, and its compressed header 915-2. Headers 915-1 and 915-2 may be referred to collectively as headers 915; compressed pages 925-1 and 925-2 may be referred to collectively as compressed pages 925.

Because a single page in the memory of appliance 305 of FIG. 3 may now store more than one page, header 915-1 may also include a pointer (or offset) to where header 915-2 begins. In this manner, one compressed page 925 may help identify where the next compressed page 925 begins.

It is also possible that both of compressed pages 925-1 and 925-2 might not fit within the space of page 905. In that case, part of compressed page 925-2 might actually be found in another page of memory. In that case, header 915-2 may include a pointer to the next page where the rest of compressed page 925-2 is located.

Figure 10:
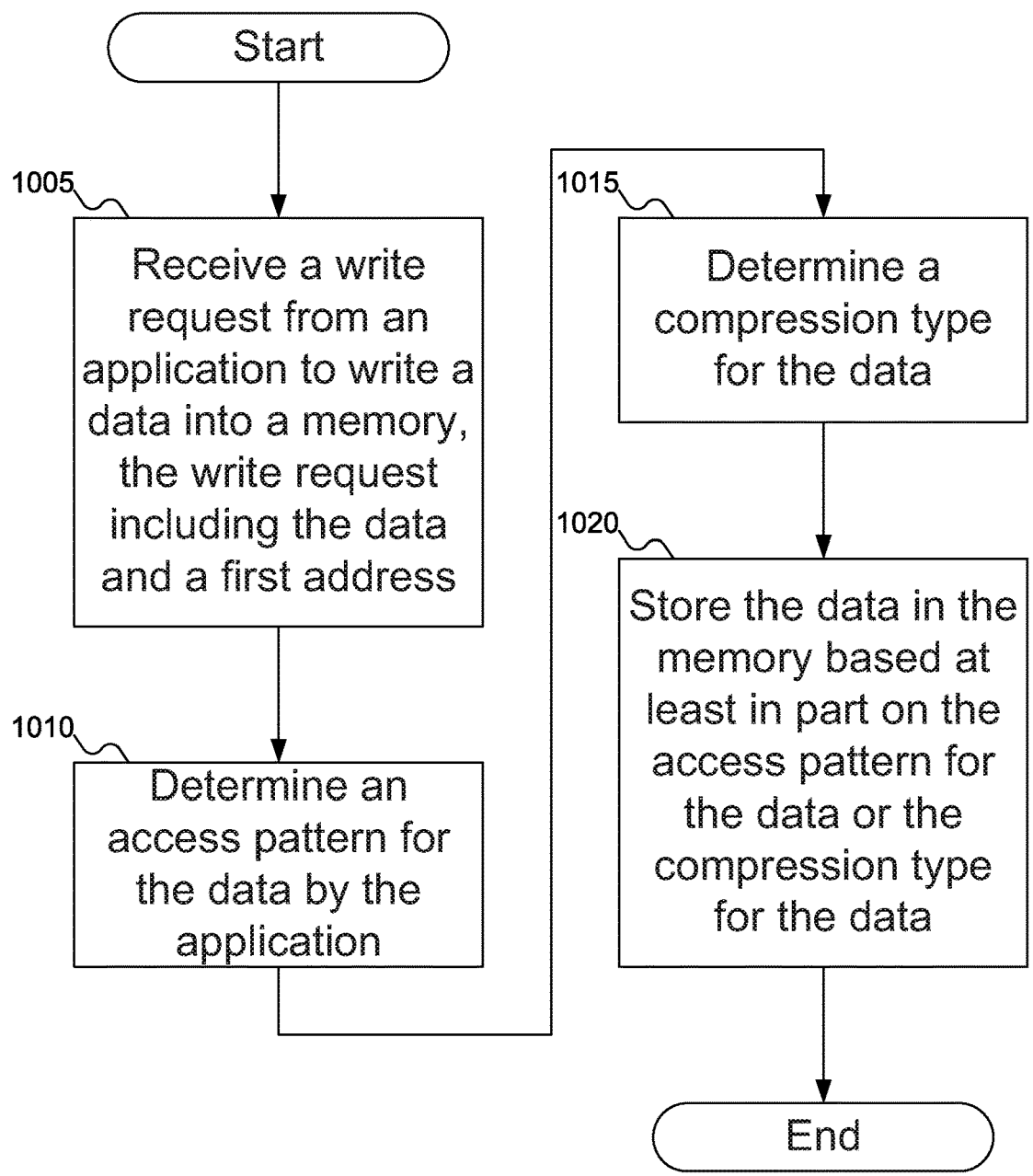
FIG. 10 shows a flowchart of an example procedure for the appliance of FIG. 3 to process the write request of FIG. 7 from the application of FIG. 7, according to embodiments of the disclosure.

FIG. 10 shows a flowchart of an example procedure for appliance 305 of FIG. 3 to process write request 710 of FIG. 7 from application 705 of FIG. 7, according to embodiments of the disclosure. In FIG. 10, at block 1005, appliance 305 of FIG. 3 may receive write request 710 of FIG. 7 from application 705 of FIG. 7. Write request 710 may include data 715 of FIG. 7 and/or host address 715 of FIG. 7. At block 1010, access pattern detector 420 of FIG. 4 may determine access pattern 520 of FIG. 5 for data 715 of FIG. 7. At block 1015, compression engine 430 of FIG. 4 may determine compression type compression type 525 of FIG. 5 for data 715 of FIG. 7. Finally, at block 1020, appliance 305 of FIG. 3 may store data 715 of FIG. 7 in its memory based on access pattern 520 of FIG. 5 and/or compression type 525 of FIG. 5.

Figure 11:
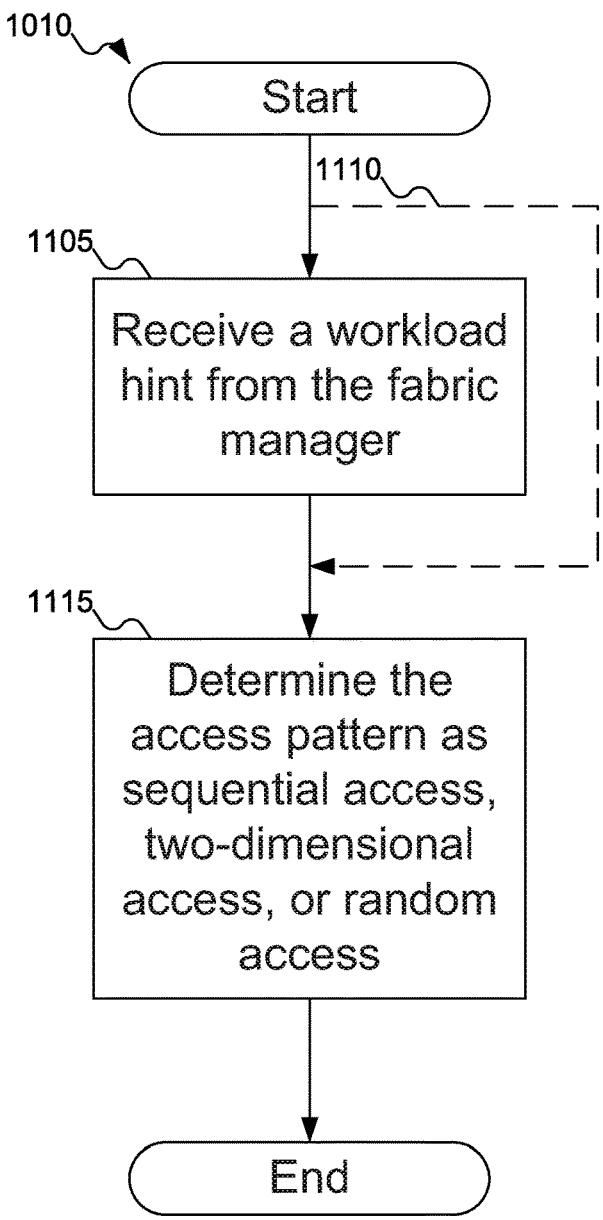
FIG. 11 shows a flowchart of an example procedure for the appliance of FIG. 3 to determine an access pattern for the data of FIG. 7, according to embodiments of the disclosure.

FIG. 11 shows a flowchart of an example procedure for appliance 305 of FIG. 3 to determine access pattern 520 of FIG. 5 for data 715 of FIG. 7, according to embodiments of the disclosure. In FIG. 11, at block 1105, appliance 305 of FIG. 3 may receive a workload hint from fabric manager 315 of FIG. 3. Block 1105 may be omitted, as shown by dashed line 1110. At block 1115, access pattern detector 420 of FIG. 4 may determine access pattern 520 of FIG. 5 for data 715 of FIG. 7. Access pattern 520 of FIG. 5 may be, among other possibilities, a sequential access pattern, a tiled (i.e., a two-dimensional) access pattern, or a random access pattern.

Figure 12:
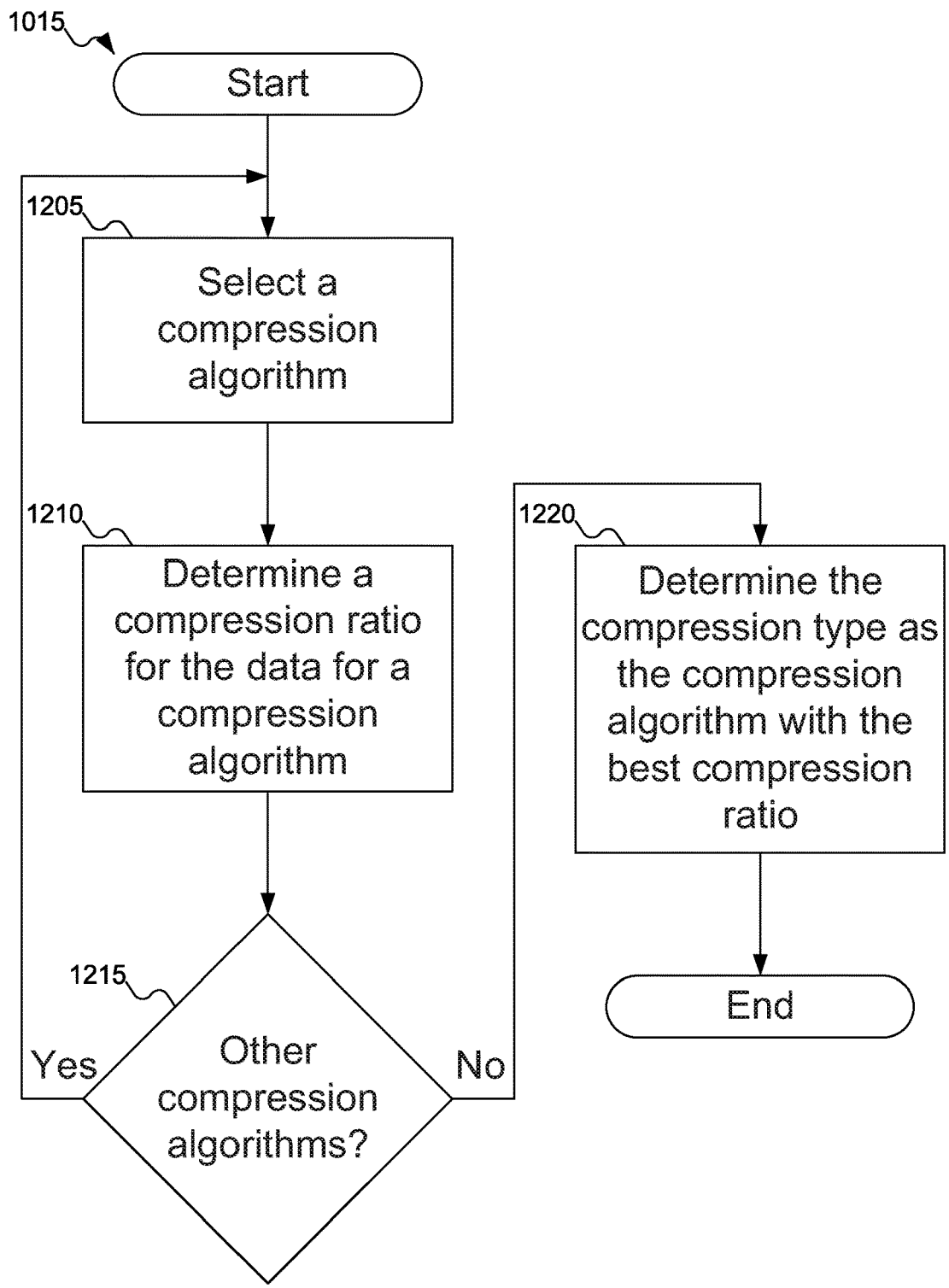
FIG. 12 shows a flowchart of an example procedure for the appliance of FIG. 3 to determine a compression type for the data of FIG. 7, according to embodiments of the disclosure.

FIG. 12 shows a flowchart of an example procedure for appliance 305 of FIG. 3 to determine compression type 525 of FIG. 5 for data 715 of FIG. 7, according to embodiments of the disclosure. In FIG. 12, at block 1205, compression engine 430 of FIG. 4 may select a compression algorithm to try. At block 1210, compression engine 430 of FIG. 4 may determine a compression ratio for the selected compression algorithm applied to data 715 of FIG. 7.

At block 1215, compression engine 430 of FIG. 4 may determine if there are other compression algorithms to test. If so, then control may return to block 1205 to select another compression algorithm. Otherwise, at block 1220, compression engine 430 of FIG. 4 may determine the compression type based on which compression algorithm resulted in the best compression ratio for data 715 of FIG. 7. If more than one compression algorithm returned equally usable compression ratios, compression engine 430 of FIG. 4 may select among the available options using any desired approach. Note that it is also possible that no compression algorithm returned a sufficient compression ratio to justify compressing data 715 of FIG. 7, in which case compression engine 430 of FIG. 4 may determine the compression type as non-compressible.

Figure 13:
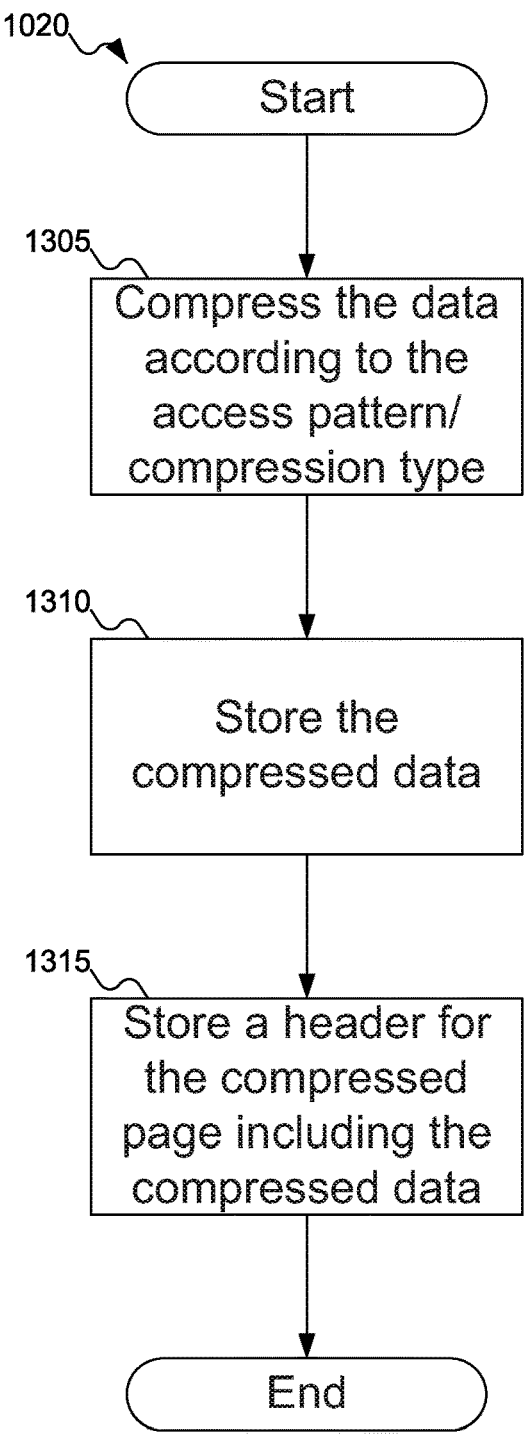
FIG. 13 shows a flowchart of an example procedure for the appliance of FIG. 3 to compress and store the data of FIG. 7, according to embodiments of the disclosure.

FIG. 13 shows a flowchart of an example procedure for appliance 305 of FIG. 3 to compress and store data 715 of FIG. 7, according to embodiments of the disclosure. In FIG. 13, at block 1305, compression engine 430 of FIG. 4 may compress data 715 of FIG. 7 according to access pattern 520 of FIG. 5 and/or compression type 525 of FIG. 5. Compression engine 430 of FIG. 4 may operate on data 715 of FIG. 7 wherever it may be stored: on data inline with write engine 415 of FIG. 4 and the memory of appliance 305 of FIG. 3, in buffer 435 of FIG. 4, or in the memory of appliance 305 of FIG. 3, in which case the data may be stored at host address 520 of FIG. 5, device address 610 of FIG. 6, or another address in the memory of appliance 305 of FIG. 3. At block 1310, appliance 305 of FIG. 3 may store the (compressed) data in its memory, and which may be at device address 610 of FIG. 6. Note that if (uncompressed) data 715 of FIG. 7 was already stored in the memory of appliance 305 of FIG. 3, the (compressed) data might not need to be stored again the memory of appliance 305 of FIG. 3 (compression engine 430 of FIG. 4 might operate on data 715 of FIG. 7 in place in the memory of appliance 305 of FIG. 3), or must just be moved from one address in the memory of appliance 305 of FIG. 3 to device address 610 of FIG. 6. Finally, at block 1315, compression engine 430 of FIG. 4 may store header 915 of FIG. 9, which may include pointers or offsets to where the (compressed) data is stored. The header may also include a pointer to another page in the memory of appliance 305 of FIG. 3 where a portion of the (compressed) data may be stored, if the (compressed) data crosses a page boundary.

Figure 14:
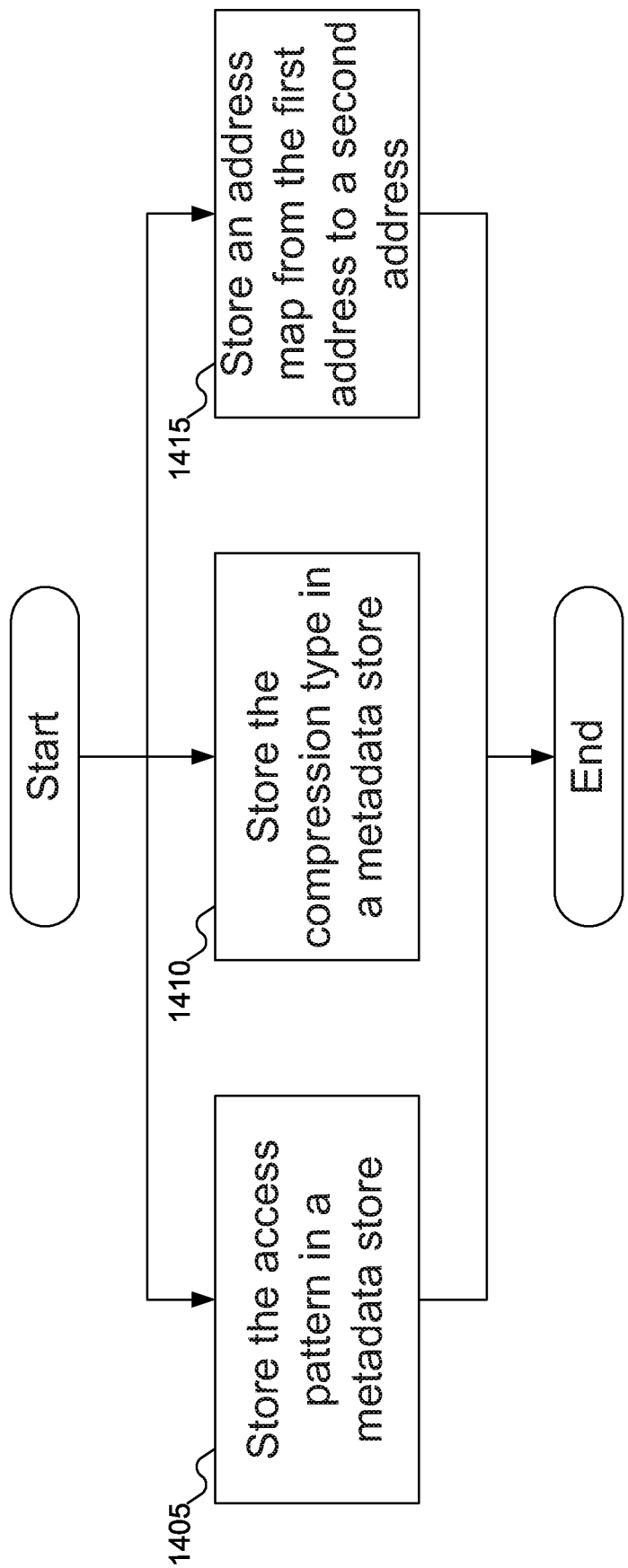
FIG. 14 shows a flowchart of an example procedure for the appliance of FIG. 3 to store metadata for the data of FIG. 7, according to embodiments of the disclosure.

FIG. 14 shows a flowchart of an example procedure for appliance 305 of FIG. 3 to store metadata for data 715 of FIG. 7, according to embodiments of the disclosure. At block 1405, access pattern 520 of FIG. 5 may be stored in metadata store 425 of FIG. 4. Alternatively (or additionally), at block 1410, compression type 525 of FIG. 5 may be stored in metadata store 425 of FIG. 4. Alternatively (or additionally), at block 1415, a mapping from host address 515 of FIG. 5 to device address 610 of FIG. 6 may be stored in address map 440 of FIG. 4.

Figure 15:
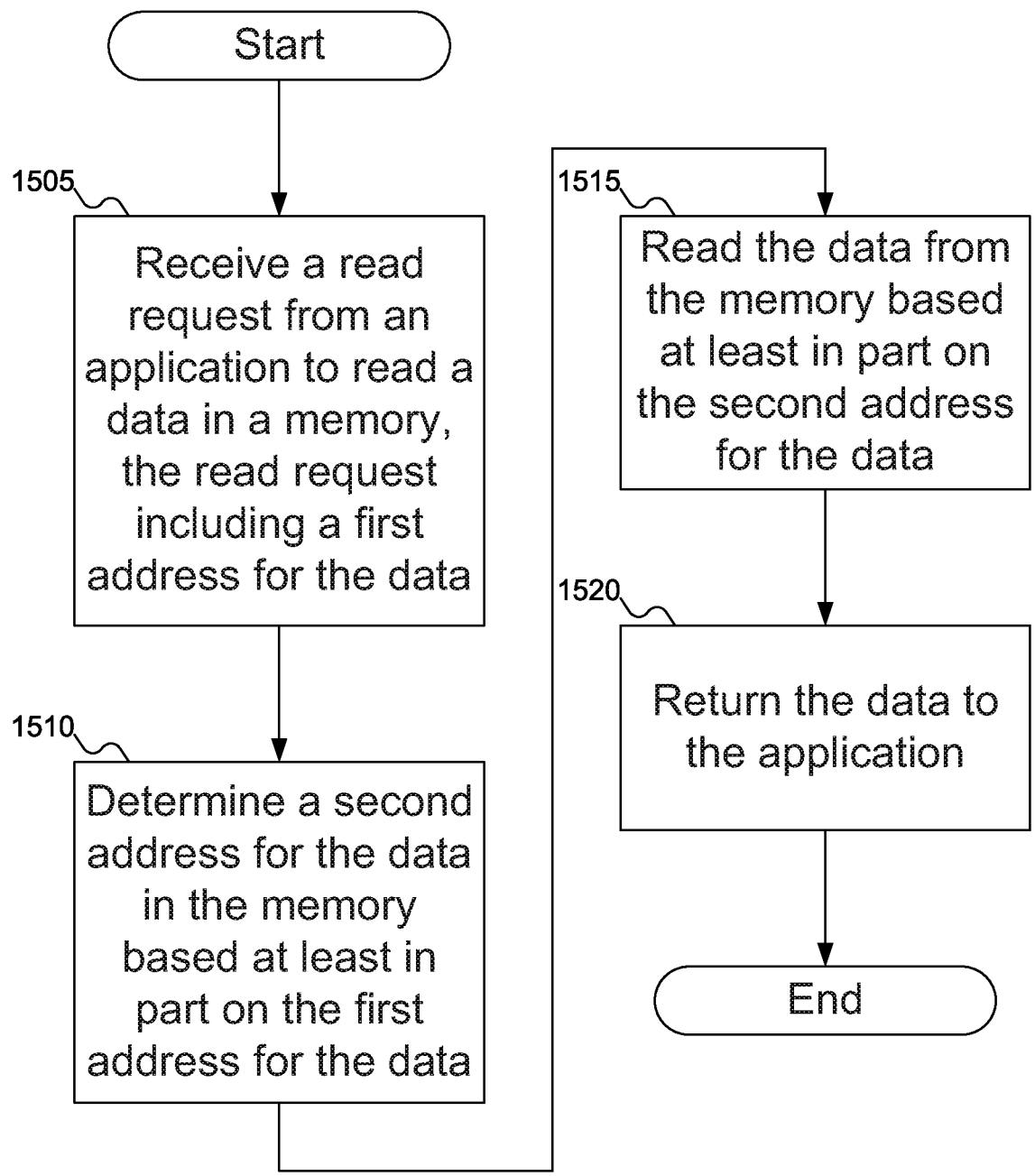
FIG. 15 shows a flowchart of an example procedure for the appliance of FIG. 3 to process the read request of FIG. 8 from the application of FIG. 7, according to embodiments of the disclosure.

FIG. 15 shows a flowchart of an example procedure for appliance 305 of FIG. 3 to process read request 805 of FIG. 8 from application 705 of FIG. 7, according to embodiments of the disclosure. In FIG. 15, at block 1505, appliance 305 of FIG. 3 may receive read request 805 of FIG. 8 from application 705 of FIG. 7. Read request 805 of FIG. 8 may include host address 515 of FIG. 5, identifying the data to be read. At block 1510, appliance 305 of FIG. 3 may use address map 440 of FIG. 4 to map host address 515 of FIG. 5 to device address 610 of FIG. 6, where the data may be stored. At block 1515, appliance 305 of FIG. 3 may read the (compressed) data from device address 610 of FIG. 6 in the memory of appliance 305 of FIG. 3. Finally, at block 1520, appliance 305 of FIG. 3 may return the data to application 705 of FIG. 7.

Figure 16:
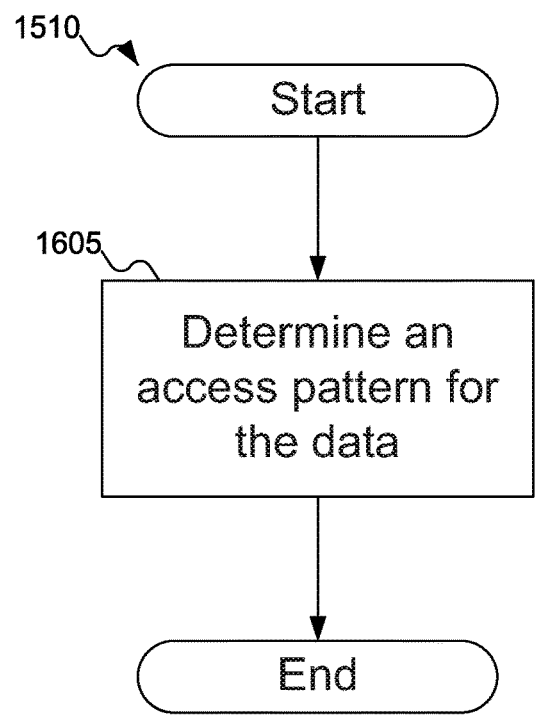
FIG. 16 shows a flowchart of an example procedure for the appliance of FIG. 3 to determine an access pattern for the data of the read request of FIG. 8, according to embodiments of the disclosure.

FIG. 16 shows a flowchart of an example procedure for appliance 305 of FIG. 3 to determine access pattern 520 of FIG. 5 for data 715 of read request 805 of FIG. 8, according to embodiments of the disclosure. In FIG. 16, at block 1605, appliance 305 of FIG. 3 may determine access pattern 520 of FIG. 5 for data 705 of FIG. 7. Appliance 305 of FIG. 3 may determine access pattern 520 of FIG. 5 by reading access pattern 520 of FIG. 5 from metadata store 425 of FIG. 7, or by using access pattern detector 420 of FIG. 4, as described above.

Figure 17:
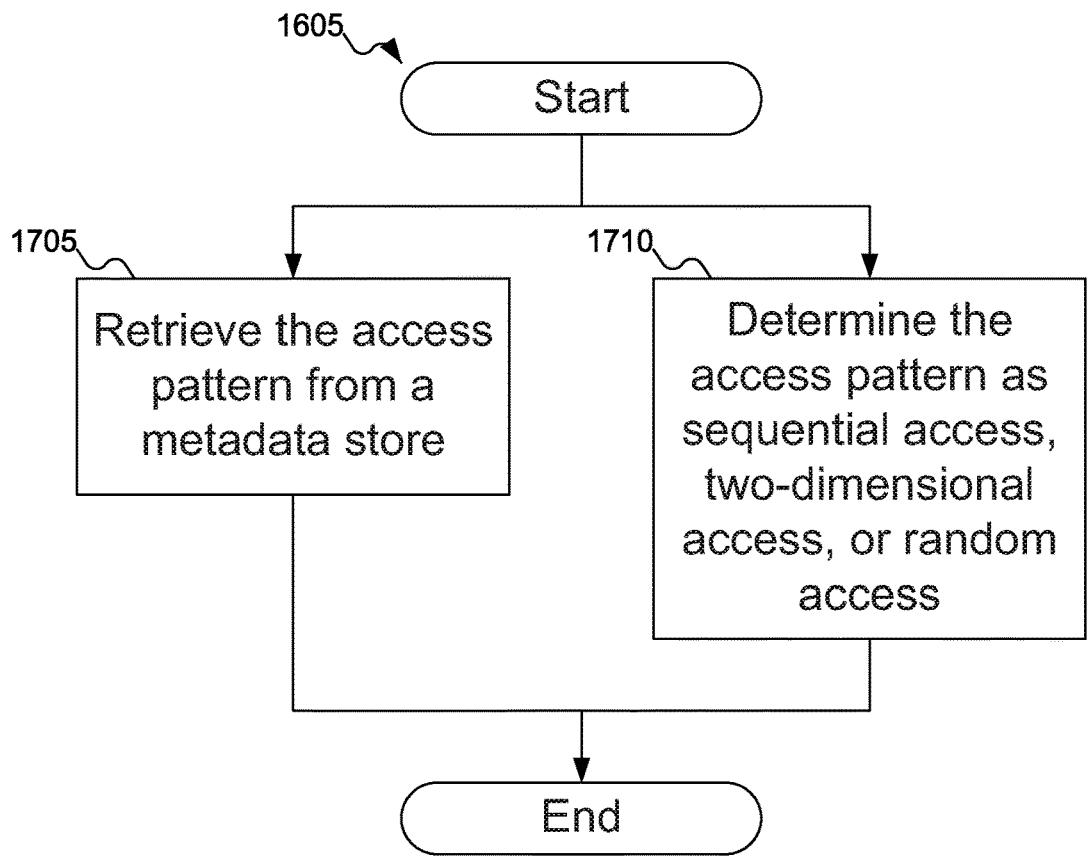
FIG. 17 shows a flowchart of an example procedure for the appliance of FIG. 3 including additional operations to determine an access pattern for the data of the read request of FIG. 8, according to embodiments of the disclosure.

FIG. 17 shows a flowchart of an example procedure for appliance 305 of FIG. 3 including additional operations to determine access pattern 520 of FIG. 5 for data 715 of read request 805 of FIG. 8, according to embodiments of the disclosure. In FIG. 17, at block 1705, appliance 305 of FIG. 3 may read access pattern 520 of FIG. 5 from metadata store 425 of FIG. 3. Alternatively (or additionally), at block 1710, appliance 305 of FIG. 3 may use access pattern detector 420 of FIG. 4 to determine access pattern 520 of FIG. 5 for data 715 of FIG. 7.

Figure 18:
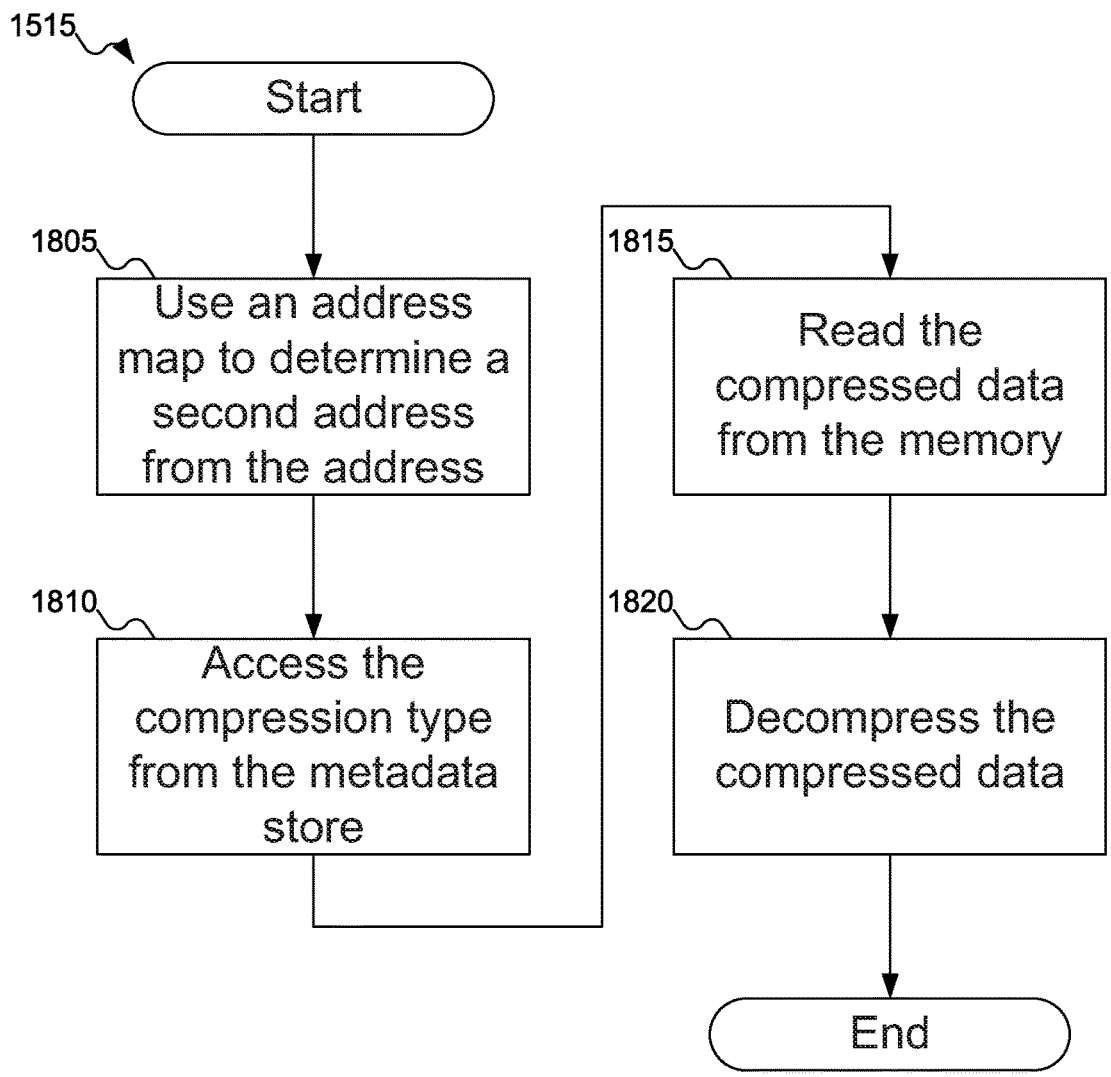
FIG. 18 shows a flowchart of an example procedure for the appliance of FIG. 3 to read and decompress the data of the read request of FIG. 8, according to embodiments of the disclosure.

FIG. 18 shows a flowchart of an example procedure for appliance 305 of FIG. 3 to read and decompress data 715 of read request 805 of FIG. 8, according to embodiments of the disclosure. In FIG. 18, at block 1805, appliance 305 of FIG. 3 may use address map 440 of FIG. 4 to determine device address 610 of FIG. 6 based on host address 515 of FIG. 5. At block 1810, appliance 305 of FIG. 3 may access compression type 525 of FIG. 5 from metadata store 425 of FIG. 4. At block 1815, appliance 305 of FIG. 3 may read the compressed data from the memory of appliance 305 of FIG. 3. Note that in some situations, the data may be stored in buffer 435 of FIG. 4, and may be read from there instead. Finally, at block 1820, appliance 305 of FIG. 3 may decompress the compressed data.

Figure 19:
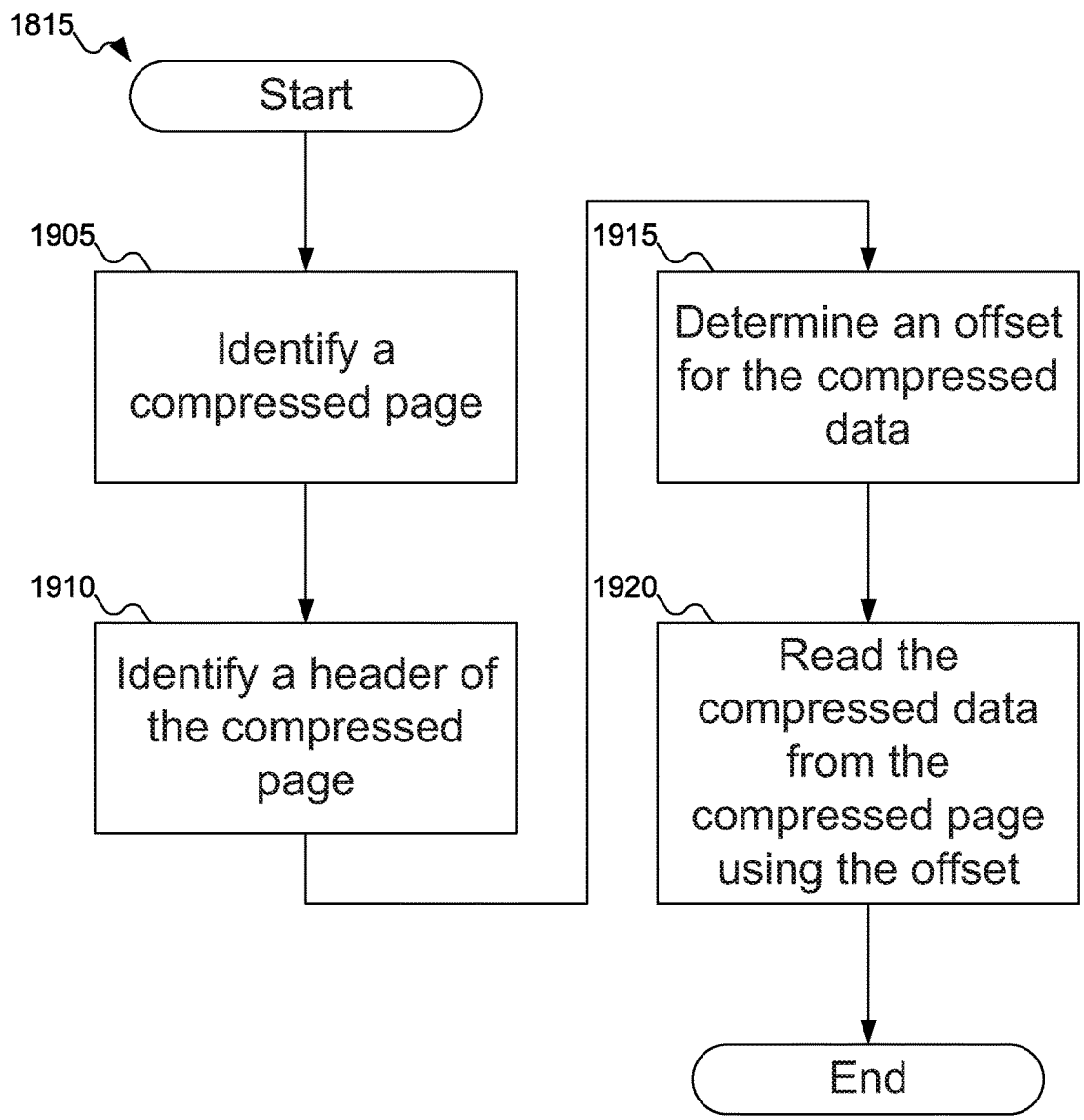
FIG. 19 shows a flowchart of an example procedure for the appliance of FIG. 3 to access and decompress the data of the read request of FIG. 8, according to embodiments of the disclosure.

FIG. 19 shows a flowchart of an example procedure for appliance 305 of FIG. 3 to access and decompress data 715 of read request 805 of FIG. 8, according to embodiments of the disclosure. In FIG. 19, at block 1905, appliance 305 of FIG. 3 may identify compressed page 925 of FIG. 9. At block 1910, appliance 305 of FIG. 3 may identify header 915 of FIG. 9. At block 1915, appliance may identify offset 920 of FIG. 9, which may indicate where compressed data 910 of FIG. 9 is actually stored within compressed page 925 of FIG. 9. Finally, at block 1920, appliance 305 of FIG. 3 may read compressed data 910 of FIG. 9 from compressed page 925 of FIG. 9. In some situations, compressed data 910 of FIG. 9 may be split across pages in the memory of appliance 305 of FIG. ##, in which case a portion of compressed data 910 of FIG. 9 may be read from another compressed page 925 of FIG. 9.

In FIGS. 10-19, some embodiments of the disclosure are shown. But a person skilled in the art will recognize that other embodiments of the disclosure are also possible, by changing the order of the blocks, by omitting blocks, or by including links not shown in the drawings. All such variations of the flowcharts are considered to be embodiments of the disclosure, whether expressly described or not.

Embodiments of the disclosure may have an appliance include a volatile storage and a non-volatile storage. Data may be stored in the volatile storage in a compressed format, which may enable storing more data than the stated capacity of the volatile storage. The non-volatile storage may be used in case compression of data in the volatile storage is insufficient to store as much data as may be advertised. Embodiments of the disclosure offer a technical advantage in reducing the amount of volatile storage needed, or alternatively, increasing the amount of data that may be stored in the volatile storage without actually increasing the capacity of the volatile storage, thereby reducing costs.

Dynamic Random Access Memory (DRAM) requirements are trending upwards. Memory pooling is way to scale the available DRAM to the host applications. Memory pooling allows a large amount of memory to be shared across multiple hosts. The memory pool may be managed and allocated by the fabric manager (or equivalent). Once allocated, the memory is dedicated to a host. But DRAM is not very cost-effective.

Embodiments of the disclosure may provide a fast inline compression in a pooled memory device with cost-effective memory to tolerate variable compression rates. Embodiments of the disclosure may offer low overhead compression, a minimal latency increase due to smaller compression blocks, and may be fail-safe against unavailability of DRAM as a low-cost NAND is available.

A Pattern Detector may detect a sequential (speech/text/time-series) or a tile access pattern. The fabric manager may provide workload hint. Vendor-unique fields may be used while allocating memory. Embodiments of the disclosure may involve kernel changes, especially around memory allocation.

A Compression Engine may apply potential compression technologies. Example compression technologies may include: Lempel-Ziv-Oberhumer (LZO)/LZ4 (similar to LZO) for text (64 B-256 B units; Delta+Entropy in one-dimensional space for time-series, speech, vibration and sensor data (64 B-256 B units); Delta+Entropy in two-dimensional space: for image data (4×4 or 8×8 pixel grid); or potential deduplication of data.

Uncompressed data may be stored at the original address unless the original address maps to an upper address range (virtual address range). A bitmap may indicate if the address is directly mapped or via the address remap table.

An Address remap table may be a sparsely populated table with hash lookup engine or equivalent.

An SRAM Cache may be used for read-modify-write (RMW) of compressed data, and to store an uncompressed copy of the compressed data. The SRAM cache may be small as deployed compression/decompression schemes are designed for speed.

A Background scan/compression (which is optional) may include an engine to scan the DRAM content and compress the data in the background. The background scan/compression may also perform the potential defragmentation of address remap table for some embodiments of the disclosure. Such background operations may suspend themselves and provide higher priority access to host operations.

A deep address translation table may be used to manage compression information and address remap. Embodiments of the disclosure may align the compressed page map unit to the host page size: for example, 4 KB. Non-compressible pages may be stored at the original address without requiring remap. The overhead for non-compressible data may be 1 bit per page. The compressed pages remap table is paid for by the compression itself. Most of the application and kernel context may be stored in directly attached DRAM so data is most-likely to be compressible in the pooled memory.

While compression might add latency, the compression unit may be 64 B-256 B instead of a whole page. The latency added by compression may be marginal compared to total access from the host. The memory cache may also be used.

Because compression might involve variable compression rates, the overall capacity may be non-deterministic (it may vary over time depending on the level of compression applicable to the data), which may lead to memory space being unavailable for applications at times. Unavailable space may be backed by low latency not-and (LLNAND) or more cost-effective memory (for example, Phase-Change Memory (PCM), Resistive RAM (RRAM), or Magnetoresistive RAM (MRAM)).

A reported memory capacity may guarantee that system has the DRAM available for most of the time for a given the customer workload.

The ratio between DRAM and more cost-effective memory may be fine-tuned based on a tolerance level of an application. If compression rate degrades, accesses may be directed to the slower/cheaper memory. The system may remain reliable, even if performance is slightly reduced.

As an example, a system may have 4 TB of pooled memory, consisting of 3 TB of DRAM and 1 TB of LLNAND. In this example, an average of 30% compression rate may be achievable.

Many workloads and data types are well defined and compressible. For example, machine learning and AI workloads tend to include more compressible data.

The training data read from the storage such as image and audio may be compressed and may be uncompressed and written to the pooled memory. This allows for more effective inline compression. Fast and lossless compression schemes may be deployed with minimal addition to the latency. Audio Data for speech processing tends to be 30% compressible (a worst case scenario). More compression may be possible for stereo or multichannel processing (sound source localization). Vibration data or volatile time-series data tends to be 30% compressible. Typical Sensor data tends to be 80%+compressible. Text data tends to be 30%-50% compressible. Image data tends to be 80% compressible.

Even 30% of average compression allows big cost/capacity benefits.

Embodiments of the disclosure may offer increased capacity, reduced cost, and a potential average power savings (average power per bit).

As an example cost-benefit analysis, currently, DRAM costs approximately $1.50 per GB, whereas LLNAND costs approximately $0.27 per GB. 4 TB of DRAM would therefore cost approximately $6000. But with a mix of 3 TB of DRAM and 1 TB of LLNAND, the total cost would be approximately $4800, saving approximately $1200.

The following discussion is intended to provide a brief, general description of a suitable machine or machines in which certain aspects of the disclosure may be implemented. The machine or machines may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines may include embedded controllers, such as programmable or non-programmable logic devices or arrays, Application Specific Integrated Circuits (ASICs), embedded computers, smart cards, and the like. The machine or machines may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciate that network communication may utilize various wired and/or wireless short range or long range carriers and protocols, including radio frequency (RF), satellite, microwave, Institute of Electrical and Electronics Engineers (IEEE) 802.11, Bluetooth®, optical, infrared, cable, laser, etc.

Embodiments of the present disclosure may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Embodiments of the disclosure may include a tangible, non-transitory machine-readable medium comprising instructions executable by one or more processors, the instructions comprising instructions to perform the elements of the disclosures as described herein.

The various operations of methods described above may be performed by any suitable means capable of performing the operations, such as various hardware and/or software component(s), circuits, and/or module(s). The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

Having described and illustrated the principles of the disclosure with reference to illustrated embodiments, it will be recognized that the illustrated embodiments may be modified in arrangement and detail without departing from such principles, and may be combined in any desired manner. And, although the foregoing discussion has focused on particular embodiments, other configurations are contemplated. In particular, even though expressions such as "according to an embodiment of the disclosure" or the like are used herein, these phrases are meant to generally reference embodiment possibilities, and are not intended to limit the disclosure to particular embodiment configurations. As used herein, these terms may reference the same or different embodiments that are combinable into other embodiments.

The foregoing illustrative embodiments are not to be construed as limiting the disclosure thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this disclosure as defined in the claims.

Embodiments of the disclosure may extend to the following statements, without limitation:

Statement 1. An embodiment of the disclosure includes an appliance, comprising:
a write engine to process a write request from an application to write a first data into a memory, the write request including the first data and an address;
a compression engine to compress the first data to produce a first compressed data; and
a write module to store the first compressed data in the memory,
wherein the first data is a first part of a page, the page further including a second data as a second part, and
the first compressed data is a first part of a compressed page, the compressed page further including a second compressed data as a second part.

Statement 2. An embodiment of the disclosure includes the appliance according to statement 1, wherein the memory includes a pooled memory.

Statement 3. An embodiment of the disclosure includes the appliance according to statement 1, wherein the memory includes a volatile storage.

Statement 4. An embodiment of the disclosure includes the appliance according to statement 1, wherein the volatile storage includes a Dynamic Random Access Memory (DRAM).

Statement 5. An embodiment of the disclosure includes the appliance according to statement 1, wherein at least one of the write engine and the compression engine is implemented using a Field Programmable Gate Array (FPGA), an Application-Specific Integrated Circuit (ASIC), a Graphics Processing Unit (GPU), a General Purpose GPU (GPGPU), a Tensor Processing Unit (TPU), a Neural Processing Unit (NPU), a Central Processing Unit (CPU), or any combination thereof.

Statement 6. An embodiment of the disclosure includes the appliance according to statement 1, wherein the memory includes a volatile storage to store the first compressed data and a non-volatile storage as a backup to the volatile storage.

Statement 7. An embodiment of the disclosure includes the appliance according to statement 1, wherein the appliance comprises a storage device, an interface card, or a fabric manager.

Statement 8. An embodiment of the disclosure includes the appliance according to statement 7, wherein the storage device includes the memory.

Statement 9. An embodiment of the disclosure includes the appliance according to statement 8, wherein the storage device further includes a non-volatile storage.

Statement 10. An embodiment of the disclosure includes the appliance according to statement 9, wherein the non-volatile storage includes a low latency flash storage.

Statement 11. An embodiment of the disclosure includes the appliance according to statement 7, wherein the storage device includes a cache coherent interconnect storage device.

Statement 12. An embodiment of the disclosure includes the appliance according to statement 11, wherein the cache coherent interconnect storage device includes a Compute Express Link (CXL) storage device.

Statement 13. An embodiment of the disclosure includes the appliance according to statement 12, wherein the CXL storage device includes a CXL Solid State Drive (SSD).

Statement 14. An embodiment of the disclosure includes the appliance according to statement 1, wherein the write engine includes an access pattern detector to detect an access pattern for the first data by the application.

Statement 15. An embodiment of the disclosure includes the appliance according to statement 14, wherein a fabric manager is configured to provide a workload hint to the access pattern detector regarding the access pattern for the first data by the application.

Statement 16. An embodiment of the disclosure includes the appliance according to statement 14, further comprising a metadata store to store the access pattern for the first data by the application associated with the address.

Statement 17. An embodiment of the disclosure includes the appliance according to statement 14, wherein the compression engine is configured to compress the first data to produce the first compressed data based at least in part on the access pattern for the first data by the application.

Statement 18. An embodiment of the disclosure includes the appliance according to statement 1, wherein the compression engine is configured to determine a compression type for the first data.

Statement 19. An embodiment of the disclosure includes the appliance according to statement 18, wherein the compression engine is configured to determine the compression type for the first data from a first compression type or a second compression type.

Statement 20. An embodiment of the disclosure includes the appliance according to statement 19, wherein the second compression type is a non-compressible type.

Statement 21. An embodiment of the disclosure includes the appliance according to statement 18, further comprising a metadata store to store the compression type associated with the address.

Statement 22. An embodiment of the disclosure includes the appliance according to statement 18, wherein the compression engine is configured to compress the first data to produce the first compressed data based at least in part on the compression type for the first data.

Statement 23. An embodiment of the disclosure includes the appliance according to statement 1, wherein:
the appliance further comprises a buffer; and
the compression engine is configured to compress the first data in the buffer to produce the first compressed data.

Statement 24. An embodiment of the disclosure includes the appliance according to statement 23, wherein the compression engine is further configured to generate a header for the compressed page, the header including a first offset to the first compressed data and a second offset to the second compressed data.

Statement 25. An embodiment of the disclosure includes the appliance according to statement 24, wherein the header further includes a pointer to a second compressed page including a second part of the second compressed data.

Statement 26. An embodiment of the disclosure includes the appliance according to statement 23, wherein the compression engine is configured to compress the first data in the buffer to produce the first compressed data in a background operation.

Statement 27. An embodiment of the disclosure includes the appliance according to statement 1, wherein the write module is configured to store the first compressed data at a second address in the memory.

Statement 28. An embodiment of the disclosure includes the appliance according to statement 27, further comprising an address map to map the address to the second address.

Statement 29. An embodiment of the disclosure includes the appliance according to statement 27, wherein the compression engine is configured to compress the first data at a third address in the memory to produce the first compressed data, the third address different from the second address.

Statement 30. An embodiment of the disclosure includes the appliance according to statement 29, wherein the write module is configured to copy the first compressed data from the third address to the second address.

Statement 31. An embodiment of the disclosure includes the appliance according to statement 27, wherein the compression engine is configured to compress the first data at the second address in the memory to produce the first compressed data.

Statement 32. An embodiment of the disclosure includes an appliance, comprising:
a read engine to process a read request from an application to read a first data from a memory at an address;
a read module to read a first compressed data from the memory; and
a decompression engine to decompress the first compressed data to produce a first data,
wherein the read engine is configured to return the first data to the application,
the first data is a first part of a page, the page further including a second data as a second part, and
the first compressed data is a part of a compressed page, the compressed page further including a second compressed data as a second part.

Statement 33. An embodiment of the disclosure includes the appliance according to statement 32, wherein the memory includes a pooled memory.

Statement 34. An embodiment of the disclosure includes the appliance according to statement 32, wherein the memory includes a volatile storage.

Statement 35. An embodiment of the disclosure includes the appliance according to statement 34, wherein the volatile storage includes a Dynamic Random Access Memory (DRAM).

Statement 36. An embodiment of the disclosure includes the appliance according to statement 32, wherein at least one of the read engine and the decompression engine is implemented using a Field Programmable Gate Array (FPGA), an Application-Specific Integrated Circuit (ASIC), a Graphics Processing Unit (GPU), a General Purpose GPU (GPGPU), a Tensor Processing Unit (TPU), a Neural Processing Unit (NPU), a Central Processing Unit (CPU), or any combination thereof.

Statement 37. An embodiment of the disclosure includes the appliance according to statement 32, wherein the memory includes a volatile storage to store the first compressed data and a non-volatile storage as a backup to the volatile storage.

Statement 38. An embodiment of the disclosure includes the appliance according to statement 32, wherein the appliance comprises a storage device, an interface card, or a fabric manager.

Statement 39. An embodiment of the disclosure includes the appliance according to statement 38, wherein the storage device includes the memory.

Statement 40. An embodiment of the disclosure includes the appliance according to statement 39, wherein the storage device further includes a non-volatile storage.

Statement 41. An embodiment of the disclosure includes the appliance according to statement 40, wherein the non-volatile storage includes a low latency flash storage.

Statement 42. An embodiment of the disclosure includes the appliance according to statement 38, wherein the storage device includes a cache coherent interconnect storage device.

Statement 43. An embodiment of the disclosure includes the appliance according to statement 42, wherein the cache coherent interconnect storage device includes a Compute Express Link (CXL) storage device.

Statement 44. An embodiment of the disclosure includes the appliance according to statement 43, wherein the CXL storage device includes a CXL Solid State Drive (SSD).

Statement 45. An embodiment of the disclosure includes the appliance according to statement 32, wherein the read engine includes an access pattern detector to detect an access pattern for the first data by the application.

Statement 46. An embodiment of the disclosure includes the appliance according to statement 45, wherein:
the appliance further comprises a metadata store to store the access pattern for the first data by the application associated with the address; and
the access pattern detector is configured to read the access pattern from the metadata store.

Statement 47. An embodiment of the disclosure includes the appliance according to statement 32, wherein the decompression engine is configured to determine a compression type for the first compressed data.

Statement 48. An embodiment of the disclosure includes the appliance according to statement 47, wherein:
the appliance further comprises a metadata store to store the compression type associated with the address; and
the decompression engine is configured to read the compression type from the metadata store.

Statement 49. An embodiment of the disclosure includes the appliance according to statement 32, wherein:
the appliance further comprises a buffer; and
the decompression engine is configured to decompress the first compressed data in the buffer to produce the first data.

Statement 50. An embodiment of the disclosure includes the appliance according to statement 49, wherein the decompression engine is further configured to read the first compressed data from the memory based at least in part on a header for the compressed page, the header including an offset to the first compressed data.

Statement 51. An embodiment of the disclosure includes the appliance according to statement 32, wherein the decompression engine is configured to decompress the first compressed data to produce the first data inline.

Statement 52. An embodiment of the disclosure includes the appliance according to statement 32, wherein:
the appliance further comprises an address map to map the address to a second address; and
the read module is configured to read the first compressed data from the memory at the second address.

Statement 53. An embodiment of the disclosure includes a method, comprising:
receiving a write request from an application to write a data into a memory, the write request including the data and an address;
determining an access pattern for the data by the application;
determining a compression type for the data; and
storing the data in the memory based at least in part on the access pattern for the data or the compression type for the data.

Statement 54. An embodiment of the disclosure includes the method according to statement 53, wherein the memory includes a pooled memory.

Statement 55. An embodiment of the disclosure includes the method according to statement 53, wherein receiving the write request from the application to write the data into the memory, the write request including the data and the address includes receiving the write request from the application to write the data into the memory at one of a storage device including the memory or a fabric manager.

Statement 56. An embodiment of the disclosure includes the method according to statement 53, wherein the memory is in a storage device.

Statement 57. An embodiment of the disclosure includes the method according to statement 56, wherein the storage device includes a cache coherent interconnect storage device.

Statement 58. An embodiment of the disclosure includes the method according to statement 57, wherein the cache coherent interconnect storage device includes a Compute Express Link (CXL) storage device.

Statement 59. An embodiment of the disclosure includes the method according to statement 58, wherein the CXL storage device includes a CXL Solid State Drive (SSD).

Statement 60. An embodiment of the disclosure includes the method according to statement 53, wherein determining the access pattern for the data by the application includes determining one of a sequential access pattern for the data, a two-dimensional access pattern for the data, or a random access pattern for the data.

Statement 61. An embodiment of the disclosure includes the method according to statement 53, wherein determining the access pattern for the data by the application includes receiving a workload hint regarding the access pattern for the data by the application.

Statement 62. An embodiment of the disclosure includes the method according to statement 61, wherein receiving the workload hint regarding the access pattern for the data by the application includes receiving the workload hint from a fabric manager regarding the access pattern for the data by the application.

Statement 63. An embodiment of the disclosure includes the method according to statement 53, wherein determining the compression type for the data includes:
determining a compression ratio for the data for a compression algorithm; and
determining the compression type based at least in part on the compression ratio or the compression algorithm.

Statement 64. An embodiment of the disclosure includes the method according to statement 63, wherein:

determining the compression type for the data further includes determining a second compression ratio for the data for a second compression algorithm; and determining the compression type based at least in part on the compression ratio or the compression algorithm includes determining the compression type based at least in part on the compression ratio, the second compression ratio, the compression algorithm, or the second compression algorithm.

Statement 65. An embodiment of the disclosure includes the method according to statement 63, wherein determining the compression type based at least in part on the compression ratio or the compression algorithm includes determining a non-compressible type based at least in part on the compression ratio or the compression algorithm.

Statement 66. An embodiment of the disclosure includes the method according to statement 53, wherein storing the data in the memory based at least in part on the access pattern for the data or the compression type for the data includes storing the access pattern for the data in a metadata store for the data.

Statement 67. An embodiment of the disclosure includes the method according to statement 53, wherein storing the data in the memory based at least in part on the access pattern for the data or the compression type includes storing the compression type for the data in a metadata store for the data.

Statement 68. An embodiment of the disclosure includes the method according to statement 53, wherein storing the data in the memory based at least in part on the access pattern for the data or the compression type for the data includes storing the data in the memory at the address based at least in part on the access pattern for the data or the compression type for the data.

Statement 69. An embodiment of the disclosure includes the method according to statement 53, wherein storing the data in the memory based at least in part on the access pattern for the data or the compression type for the data includes storing the data in the memory at a second address based at least in part on the access pattern for the data or the compression type for the data.

Statement 70. An embodiment of the disclosure includes the method according to statement 69, wherein storing the data in the memory at the second address based at least in part on the access pattern for the data or the compression type for the data includes:

compressing the data to produce a compressed data based at least in part on the access pattern for the data or the compression type for the data; and storing the compressed data in the memory at the second address.

Statement 71. An embodiment of the disclosure includes the method according to statement 70, wherein storing the compressed data in the memory at the second address includes storing a map from the address to the second address.

Statement 72. An embodiment of the disclosure includes the method according to statement 70, wherein compressing the data to produce the compressed data based at least in part on the access pattern for the data or the compression type for the data includes compressing a second data in a page to produce a second compressed data based at least in part on the access pattern for the data or the compression type for the data.

Statement 73. An embodiment of the disclosure includes the method according to statement 72, wherein storing the compressed data in the memory at the second address includes:

storing the compressed data and the second compressed data as a compressed page in the memory, the compressed page corresponding to a page including the data and the second data;

storing a header for the compressed page, the header including a first offset for the compressed data in the compressed page and a second offset for the second data in the compressed page.

Statement 74. An embodiment of the disclosure includes the method according to statement 73, wherein storing the header for the compressed page includes storing a pointer to a second compressed page including a part of the second data.

Statement 75. An embodiment of the disclosure includes the method according to statement 70, wherein compressing the data to produce the compressed data based at least in part on the access pattern for the data or the compression type for the data includes:

storing the data in a buffer;

compressing the data to produce the compressed data in the buffer based at least in part on the access pattern for the data or the compression type for the data; and storing the compressed data in the memory at the second address.

Statement 76. An embodiment of the disclosure includes the method according to statement 75, wherein compressing the data to produce the compressed data in the buffer based at least in part on the access pattern for the data or the compression type for the data includes compressing the data in a background operation to produce the compressed data in the buffer based at least in part on the access pattern for the data or the compression type for the data.

Statement 77. An embodiment of the disclosure includes the method according to statement 70, wherein:

storing the compressed data in the memory at the second address includes storing the data in the memory; and compressing the data to produce the compressed data based at least in part on the access pattern for the data or the compression type for the data includes compressing the data in the memory to produce the compressed data based at least in part on the access pattern for the data or the compression type for the data.

Statement 78. An embodiment of the disclosure includes the method according to statement 77, wherein:

storing the compressed data in the memory at the second address includes storing the data in the memory at a third address, the third address different from the second address;

compressing the data in the memory to produce the compressed data based at least in part on the access pattern for the data or the compression type for the data includes compressing the data at the third address in the memory to produce the compressed data based at least in part on the access pattern for the data or the compression type for the data; and storing the data in the memory at the second address based at least in part on the access pattern for the data or the compression type for the data further includes copying the compressed data from the third address to the second address.

Statement 79. An embodiment of the disclosure includes the method according to statement 78, wherein the third address is the address.

Statement 80. An embodiment of the disclosure includes the method according to statement 77, wherein:

storing the compressed data in the memory at the second address includes storing the data in the memory at the second address; and compressing the data in the memory to produce the compressed data based at least in part on the access pattern for the data or the compression type for the data includes compressing the data at the second address in the memory to produce the compressed data based at least in part on the access pattern for the data or the compression type for the data.

Statement 81. An embodiment of the disclosure includes a method, comprising:

receiving a read request from an application to read a data in a memory, the read request including a first address for the data;

determining a second address for the data in the memory based at least in part on the first address for the data;

reading the data from the memory based at least in part on the second address for the data; and returning the data to the application.

Statement 82. An embodiment of the disclosure includes the method according to statement 81, wherein the memory includes a pooled memory.

Statement 83. An embodiment of the disclosure includes the method according to statement 81, wherein receiving the read request from the application to access the data in the memory includes receiving the read request from the application to access the data in the memory at one of a storage device including the memory, an interface card, or a fabric manager.

Statement 84. An embodiment of the disclosure includes the method according to statement 81, wherein the memory is in a storage device.

Statement 85. An embodiment of the disclosure includes the method according to statement 84, wherein the storage device includes a cache coherent interconnect storage device.

Statement 86. An embodiment of the disclosure includes the method according to statement 85, wherein the cache coherent interconnect storage device includes a Compute Express Link (CXL) storage device.

Statement 87. An embodiment of the disclosure includes the method according to statement 86, wherein the CXL storage device includes a CXL Solid State Drive (SSD).

Statement 88. An embodiment of the disclosure includes the method according to statement 81, wherein:

the method further comprises determining an access pattern for the data by the application; and determining the second address for the data in the memory based at least in part on the first address for the data includes determining the second address for the data in the memory based at least in part on the first address for the data or the access pattern for the data by the application.

Statement 89. An embodiment of the disclosure includes the method according to statement 88, wherein determining the access pattern for the data by the application includes determining one of a sequential access pattern for the data, a two-dimensional access pattern for the data, or a random access pattern for the data.

Statement 90. An embodiment of the disclosure includes the method according to statement 88, wherein determining the access pattern for the data by the application includes retrieving the access pattern from a metadata store for the data.

Statement 91. An embodiment of the disclosure includes the method according to statement 81, wherein determining the second address for the data in the memory based at least in part on the first address for the data includes determining the second address for the data in the memory based at least in part on the first address for the data or a compression type for the data.

Statement 92. An embodiment of the disclosure includes the method according to statement 91, wherein determining the second address for the data in the memory based at least in part on the first address for the data or the compression type for the data includes accessing the compression type for the data from a metadata store for the data.

Statement 93. An embodiment of the disclosure includes the method according to statement 81, wherein the second address includes the first address.

Statement 94. An embodiment of the disclosure includes the method according to statement 81, wherein determining the second address for the data in the memory based at least in part on the first address for the data includes mapping the first address for the data to the second address for the data.

Statement 95. An embodiment of the disclosure includes the method according to statement 91, wherein reading the data from the memory based at least in part on the second address for the data includes:

reading a compressed data from the memory based at least in part on the second address for the data; and decompressing the compressed data to produce the data based at least in part on the compression type.

Statement 96. An embodiment of the disclosure includes the method according to statement 95, wherein decompressing the compressed data to produce the data based at least in part on the compression type includes decompressing the compressed data inline to produce the data based at least in part on the compression type.

Statement 97. An embodiment of the disclosure includes the method according to statement 95, wherein reading the compressed data from the memory based at least in part on the second address for the data includes:

identifying a compressed page including the data based at least in part on the second address for the data;

identifying a header of the compressed page including the data;

determining an offset for the compressed data based at least in part on the header of the compressed page or the second address for the data; and reading the compressed data from the compressed page based at least in part on the offset.

Statement 98. An embodiment of the disclosure includes the method according to statement 97, wherein reading the compressed data from the memory based at least in part on the second address for the data further includes:

determining that a part of the compressed data is in a second compressed page based at least in part on the header of the compressed page; and reading the part of the compressed data from the second compressed page.

Statement 99. An embodiment of the disclosure includes the method according to statement 98, wherein reading the part of the compressed data from the second compressed page includes:

identifying the second compressed page including the part of the compressed data based at least in part on the header of the compressed page;

identifying a second header of the second compressed page including the part of the compressed data;

determining a second offset for the part of the compressed data based at least in part on the second header of the second compressed page; and reading the part of the compressed data from the second compressed page based at least in part on the second offset.

Statement 100. An embodiment of the disclosure includes the method according to statement 95, wherein:

decompressing the compressed data to produce the data based at least in part on the compression type includes decompressing the compressed data to produce a first uncompressed data based at least in part on the compression type; and reading the data from the memory based at least in part on the second address for the data further includes:

reading a second compressed data from the memory based at least in part on the second address for the data;

decompressing the second compressed data to produce a second uncompressed data based at least in part on the compression type; and combining the first uncompressed data and the second uncompressed data to produce the data.

Statement 101. An embodiment of the disclosure includes the method according to statement 81, wherein reading the data from the memory based at least in part on the second address for the data includes reading the data from a buffer associated with the memory.

Statement 102. An embodiment of the disclosure includes the method according to statement 101, wherein reading the data from the buffer associated with the memory includes:

copying a compressed data from the memory to the buffer; and decompressing the compressed data in the buffer to produce the data based at least in part on a compression type for the data.

Statement 103. An embodiment of the disclosure includes an article, comprising a non-transitory storage medium, the non-transitory storage medium having stored thereon instructions that, when executed by a machine, result in, comprising:

receiving a write request from an application to write a data into a memory, the write request including the data and an address;

determining an access pattern for the data by the application;

determining a compression type for the data; and storing the data in the memory based at least in part on the access pattern for the data or the compression type for the data.

Statement 104. An embodiment of the disclosure includes the article according to statement 103, wherein the memory includes a pooled memory.

Statement 105. An embodiment of the disclosure includes the article according to statement 103, wherein receiving the write request from the application to write the data into the memory, the write request including the data and the address includes receiving the write request from the application to write the data into the memory at one of a storage device including the memory or a fabric manager.

Statement 106. An embodiment of the disclosure includes the article according to statement 103, wherein the memory is in a storage device.

Statement 107. An embodiment of the disclosure includes the article according to statement 106, wherein the storage device includes a cache coherent interconnect storage device.

Statement 108. An embodiment of the disclosure includes the article according to statement 107, wherein the cache coherent interconnect storage device includes a Compute Express Link (CXL) storage device.

Statement 109. An embodiment of the disclosure includes the article according to statement 108, wherein the CXL storage device includes a CXL Solid State Drive (SSD).

Statement 110. An embodiment of the disclosure includes the article according to statement 103, wherein determining the access pattern for the data by the application includes determining one of a sequential access pattern for the data, a two-dimensional access pattern for the data, or a random access pattern for the data.

Statement 111. An embodiment of the disclosure includes the article according to statement 103, wherein determining the access pattern for the data by the application includes receiving a workload hint regarding the access pattern for the data by the application.

Statement 112. An embodiment of the disclosure includes the article according to statement 111, wherein receiving the workload hint regarding the access pattern for the data by the application includes receiving the workload hint from a fabric manager regarding the access pattern for the data by the application.

Statement 113. An embodiment of the disclosure includes the article according to statement 103, wherein determining the compression type for the data includes: determining a compression ratio for the data for a compression algorithm; and determining the compression type based at least in part on the compression ratio or the compression algorithm.

Statement 114. An embodiment of the disclosure includes the article according to statement 113, wherein:

determining the compression type for the data further includes determining a second compression ratio for the data for a second compression algorithm; and determining the compression type based at least in part on the compression ratio or the compression algorithm includes determining the compression type based at least in part on the compression ratio, the second compression ratio, the compression algorithm, or the second compression algorithm.

Statement 115. An embodiment of the disclosure includes the article according to statement 113, wherein determining the compression type based at least in part on the compression ratio or the compression algorithm includes determining a non-compressible type based at least in part on the compression ratio or the compression algorithm.

Statement 116. An embodiment of the disclosure includes the article according to statement 103, wherein storing the data in the memory based at least in part on the access pattern for the data or the compression type for the data includes storing the access pattern for the data in a metadata store for the data.

Statement 117. An embodiment of the disclosure includes the article according to statement 103, wherein storing the data in the memory based at least in part on the access pattern for the data or the compression type includes storing the compression type for the data in a metadata store for the data.

Statement 118. An embodiment of the disclosure includes the article according to statement 103, wherein storing the data in the memory based at least in part on the access pattern for the data or the compression type for the data includes storing the data in the memory at the address based at least in part on the access pattern for the data or the compression type for the data.

Statement 119. An embodiment of the disclosure includes the article according to statement 103, wherein storing the data in the memory based at least in part on the access pattern for the data or the compression type for the data includes storing the data in the memory at a second address based at least in part on the access pattern for the data or the compression type for the data.

Statement 120. An embodiment of the disclosure includes the article according to statement 119, wherein storing the data in the memory at the second address based at least in part on the access pattern for the data or the compression type for the data includes:
compressing the data to produce a compressed data based at least in part on the access pattern for the data or the compression type for the data; and
storing the compressed data in the memory at the second address.

Statement 121. An embodiment of the disclosure includes the article according to statement 120, wherein storing the compressed data in the memory at the second address includes storing a map from the address to the second address.

Statement 122. An embodiment of the disclosure includes the article according to statement 120, wherein compressing the data to produce the compressed data based at least in part on the access pattern for the data or the compression type for the data includes compressing a second data in a page to produce a second compressed data based at least in part on the access pattern for the data or the compression type for the data.

Statement 123. An embodiment of the disclosure includes the article according to statement 122, wherein storing the compressed data in the memory at the second address includes:
storing the compressed data and the second compressed data as a compressed page in the memory, the compressed page corresponding to a page including the data and the second data;
storing a header for the compressed page, the header including a first offset for the compressed data in the compressed page and a second offset for the second data in the compressed page.

Statement 124. An embodiment of the disclosure includes the article according to statement 123, wherein storing the header for the compressed page includes storing a pointer to a second compressed page including a part of the second data.

Statement 125. An embodiment of the disclosure includes the article according to statement 120, wherein compressing the data to produce the compressed data based at least in part on the access pattern for the data or the compression type for the data includes:
storing the data in a buffer;
compressing the data to produce the compressed data in the buffer based at least in part on the access pattern for the data or the compression type for the data; and
storing the compressed data in the memory at the second address.

Statement 126. An embodiment of the disclosure includes the article according to statement 125, wherein compressing the data to produce the compressed data in the buffer based at least in part on the access pattern for the data or the compression type for the data includes compressing the data in a background operation to produce the compressed data in the buffer based at least in part on the access pattern for the data or the compression type for the data.

Statement 127. An embodiment of the disclosure includes the article according to statement 120, wherein:
storing the compressed data in the memory at the second address includes storing the data in the memory; and
compressing the data to produce the compressed data based at least in part on the access pattern for the data or the compression type for the data includes compressing the data in the memory to produce the compressed data based at least in part on the access pattern for the data or the compression type for the data.

Statement 128. An embodiment of the disclosure includes the article according to statement 127, wherein:
storing the compressed data in the memory at the second address includes storing the data in the memory at a third address, the third address different from the second address;
compressing the data in the memory to produce the compressed data based at least in part on the access pattern for the data or the compression type for the data includes compressing the data at the third address in the memory to produce the compressed data based at least in part on the access pattern for the data or the compression type for the data; and
storing the data in the memory at the second address based at least in part on the access pattern for the data or the compression type for the data further includes copying the compressed data from the third address to the second address.

Statement 129. An embodiment of the disclosure includes the article according to statement 128, wherein the third address is the address.

Statement 130. An embodiment of the disclosure includes the article according to statement 127, wherein:
storing the compressed data in the memory at the second address includes storing the data in the memory at the second address; and
compressing the data in the memory to produce the compressed data based at least in part on the access pattern for the data or the compression type for the data includes compressing the data at the second address in the memory to produce the compressed data based at least in part on the access pattern for the data or the compression type for the data.

Statement 131. An embodiment of the disclosure includes an article, comprising a non-transitory storage medium, the non-transitory storage medium having stored thereon instructions that, when executed by a machine, result in, comprising:
receiving a read request from an application to read a data in a memory, the read request including a first address for the data;
determining a second address for the data in the memory based at least in part on the first address for the data;
reading the data from the memory based at least in part on the second address for the data; and
returning the data to the application.

Statement 132. An embodiment of the disclosure includes the article according to statement 131, wherein the memory includes a pooled memory.

Statement 133. An embodiment of the disclosure includes the article according to statement 131, wherein receiving the read request from the application to access the data in the memory includes receiving the read request from the application to access the data in the memory at one of a storage device including the memory, an interface card, or a fabric manager.

Statement 134. An embodiment of the disclosure includes the article according to statement 131, wherein the memory is in a storage device.

Statement 135. An embodiment of the disclosure includes the article according to statement 134, wherein the storage device includes a cache coherent interconnect storage device.

Statement 136. An embodiment of the disclosure includes the article according to statement 135, wherein the cache coherent interconnect storage device includes a Compute Express Link (CXL) storage device.

Statement 137. An embodiment of the disclosure includes the article according to statement 136, wherein the CXL storage device includes a CXL Solid State Drive (SSD).

Statement 138. An embodiment of the disclosure includes the article according to statement 131, wherein:
  the non-transitory storage medium having stored thereon further instructions that, when executed by the machine, result in, comprising determining an access pattern for the data by the application; and
  determining the second address for the data in the memory based at least in part on the first address for the data includes determining the second address for the data in the memory based at least in part on the first address for the data or the access pattern for the data by the application.

Statement 139. An embodiment of the disclosure includes the article according to statement 138, wherein determining the access pattern for the data by the application includes determining one of a sequential access pattern for the data, a two-dimensional access pattern for the data, or a random access pattern for the data.

Statement 140. An embodiment of the disclosure includes the article according to statement 138, wherein determining the access pattern for the data by the application includes retrieving the access pattern from a metadata store for the data.

Statement 141. An embodiment of the disclosure includes the article according to statement 131, wherein determining the second address for the data in the memory based at least in part on the first address for the data includes determining the second address for the data in the memory based at least in part on the first address for the data or a compression type for the data.

Statement 142. An embodiment of the disclosure includes the article according to statement 141, wherein determining the second address for the data in the memory based at least in part on the first address for the data or the compression type for the data includes accessing the compression type for the data from a metadata store for the data.

Statement 143. An embodiment of the disclosure includes the article according to statement 131, wherein the second address includes the first address.

Statement 144. An embodiment of the disclosure includes the article according to statement 131, wherein determining the second address for the data in the memory based at least in part on the first address for the data includes mapping the first address for the data to the second address for the data.

Statement 145. An embodiment of the disclosure includes the article according to statement 141, wherein reading the data from the memory based at least in part on the second address for the data includes:
  reading a compressed data from the memory based at least in part on the second address for the data; and
  decompressing the compressed data to produce the data based at least in part on the compression type.

Statement 146. An embodiment of the disclosure includes the article according to statement 145, wherein decompressing the compressed data to produce the data based at least in part on the compression type includes decompressing the compressed data inline to produce the data based at least in part on the compression type Statement 147. An embodiment of the disclosure includes the article according to statement 145, wherein reading the compressed data from the memory based at least in part on the second address for the data includes:
  identifying a compressed page including the data based at least in part on the second address for the data;
  identifying a header of the compressed page including the data;
  determining an offset for the compressed data based at least in part on the header of the compressed page or the second address for the data; and
  reading the compressed data from the compressed page based at least in part on the offset.

Statement 148. An embodiment of the disclosure includes the article according to statement 147, wherein reading the compressed data from the memory based at least in part on the second address for the data further includes:
  determining that a part of the compressed data is in a second compressed page based at least in part on the header of the compressed page; and
  reading the part of the compressed data from the second compressed page.

Statement 149. An embodiment of the disclosure includes the article according to statement 148, wherein reading the part of the compressed data from the second compressed page includes:
  identifying the second compressed page including the part of the compressed data based at least in part on the header of the compressed page;
  identifying a second header of the second compressed page including the part of the compressed data;
  determining a second offset for the part of the compressed data based at least in part on the second header of the second compressed page; and
  reading the part of the compressed data from the second compressed page based at least in part on the second offset.

Statement 150. An embodiment of the disclosure includes the article according to statement 145, wherein:
  decompressing the compressed data to produce the data based at least in part on the compression type includes decompressing the compressed data to produce a first uncompressed data based at least in part on the compression type; and
  reading the data from the memory based at least in part on the second address for the data further includes:
    reading a second compressed data from the memory based at least in part on the second address for the data;
    decompressing the second compressed data to produce a second uncompressed data based at least in part on the compression type; and
    combining the first uncompressed data and the second uncompressed data to produce the data.

Statement 151. An embodiment of the disclosure includes the article according to statement 131, wherein reading the data from the memory based at least in part on the second address for the data includes reading the data from a buffer associated with the memory.

Statement 152. An embodiment of the disclosure includes the article according to statement 151, wherein reading the data from the buffer associated with the memory includes:
copying a compressed data from the memory to the buffer; and
decompressing the compressed data in the buffer to produce the data based at least in part on a compression type for the data.

Consequently, in view of the wide variety of permutations to the embodiments described herein, this detailed description and accompanying material is intended to be illustrative only, and should not be taken as limiting the scope of the disclosure. What is claimed as the disclosure, therefore, is all such modifications as may come within the scope and spirit of the following claims and equivalents thereto.

What is claimed is:

1. An appliance, comprising:
a write circuit to process a write request from an application executing on a first processor on a first host to write a first data into a memory, the write request including the first data and an address;
a compression circuit to compress the first data to produce a first compressed data; and
a controller to store the first compressed data in a memory page in the memory and to store a metadata identifying where the first compressed data is stored within the memory page in the memory,
wherein the first data is a first part of a page, the page further including a second data as a second part of the page,
wherein the first compressed data is a first part of a compressed page, the compressed page further including a second compressed data as a second part of the compressed page, the second compressed data being a compressed version of the second data,
wherein the appliance is configured to receive a second write request from a second application executing on a second processor on a second host to write a third data into the memory, and
wherein the appliance, the first host, and the second host are separate elements.

2. The appliance according to claim 1, wherein the memory includes a volatile storage to store the first compressed data and a non-volatile storage as a backup to the volatile storage.

3. An appliance according to claim 1, wherein the write circuit includes an access pattern detector to detect an access pattern for the first data by the application.

4. An appliance according to claim 3, wherein a fabric manager is configured to provide a workload hint to the access pattern detector regarding the access pattern for the first data by the application.

5. An appliance according to claim 1, wherein the compression circuit is configured to determine a compression type for the first data based at least in part on a first compression ratio of the first data using a first compression algorithm and a second compression ratio of the first data using a second compression algorithm.

6. An appliance according to claim 1, wherein the controller is configured to store the first compressed data at a second address in the memory.

7. An appliance according to claim 6, further comprising an address map to map the address to the second address.

8. An appliance according to claim 3, wherein the compression circuit is configured to compress the first data to produce a first compressed data based at least in part on the access pattern for the first data by the application.

9. The appliance according to claim 1, wherein:
the first data is compressed using a first compression algorithm;
the second data is compressed using a second compression algorithm; and
the first compression algorithm is different from the second compression algorithm.

10. The applicant according to claim 1, wherein:
the page further includes a fourth data as a third part of the page; and
the appliance is configured to store the fourth data as an uncompressed data in the memory page in the memory.

11. An appliance, comprising:
a read circuit to process a read request from an application executing on a first processor on a first host to read a first data from a memory at an address;
a controller to read a metadata identifying where a first compressed data is stored within a memory page in the memory based on the address and to read the first compressed data from the memory page in the memory based at least in part on the metadata; and
a decompression circuit to decompress the first compressed data to produce a first data,
wherein the read circuit is configured to return the first data to the application,
the first data is a first part of a page, the page further including a second data as a second part of the page,
wherein the first compressed data is a part of a compressed page, the compressed page further including a second compressed data as a second part of the compressed page,
the second compressed data being a compressed version of the second data,
wherein the appliance is configured to receive a second read request from a second application executing on a second processor on a second host to read a third data from the memory, and
wherein the appliance, the first host, and the second host are separate elements.

12. An appliance according to claim 11, wherein the decompression circuit is configured to determine a compression type for the first compressed data, the compression type associated with the first compressed data.

13. An appliance according to claim 11, wherein the decompression circuit is configured to decompress the first compressed data to produce the first data inline.

14. An appliance according to claim 11, wherein:
the appliance further comprises an address map to map the address to a second address; and
the controller is configured to read the first compressed data from the memory at the second address.

15. The appliance according to claim 11, wherein the read circuit is configured to receive the read request from the application across a network.

16. A method, comprising:
receiving, at an appliance, a write request from an application executing on a first processor on a first host to write a data into a memory, the write request including the data and an address;
determining, at the appliance, an access pattern for the data by the application;
determining, at the appliance, a compression type for the data;
storing, by the appliance, the data in a memory page in the memory based at least in part on the access pattern for the data or the compression type for the data; and storing, by the appliance, a metadata identifying where the data is stored within the memory page in the memory, wherein the appliance is configured to receive a second write request from a second application executing on a second processor on a second host to write a third data into the memory, and wherein the appliance, the first host, and the second host are separate elements.

17. A method according to claim 16, wherein determining the access pattern for the data by the application includes receiving a workload hint regarding the access pattern for the data by the application.

18. A method according to claim 16, wherein determining the compression type for the data includes:

determining a first compression ratio for the data for a first compression algorithm;

determining a second compression ratio for the data for a second compression algorithm; and determining the compression type based at least in part on the first compression ratio and second compression ratio.

19. A method according to claim 16, wherein storing the data in the memory based at least in part on the access pattern for the data or the compression type for the data includes storing the data in the memory at a second address based at least in part on the access pattern for the data or the compression type for the data.

20. A method according to claim 19, wherein storing the data in the memory at the second address based at least in part on the access pattern for the data or the compression type for the data includes:

compressing the data to produce a compressed data based at least in part on the access pattern for the data or the compression type for the data;

storing the compressed data in the memory at the second address; and storing a map from the address to the second address.

* * * * *